United States Patent
Podoleanu et al.

(10) Patent No.: US 10,760,893 B2
(45) Date of Patent: Sep. 1, 2020

(54) APPARATUS AND METHOD FOR PROCESSING THE SIGNAL IN MASTER SLAVE INTERFEROMETRY AND APPARATUS AND METHOD FOR MASTER SLAVE OPTICAL COHERENCE TOMOGRAPHY WITH ANY NUMBER OF SAMPLED DEPTHS

(71) Applicant: University of Kent at Canterbury, Kent (GB)

(72) Inventors: Adrian Podoleanu, Canterbury (GB); Sylvain Rivet, Plouarzel (FR); Adrian Bradu, Faversham (GB); Michael Maria, Copenhagen (DK)

(73) Assignee: UNIVERSITY OF KENT, Kent (GB)

( * ) Notice: Subject to any disclaimer, the term of this patent is extended or adjusted under 35 U.S.C. 154(b) by 147 days.

(21) Appl. No.: 15/334,648

(22) Filed: Oct. 26, 2016

(65) Prior Publication Data
US 2017/0138721 A1    May 18, 2017

(30) Foreign Application Priority Data

Oct. 28, 2015   (GB) .................................. 1519055.6

(51) Int. Cl.
*G01B 9/02*   (2006.01)

(52) U.S. Cl.
CPC ..... *G01B 9/02083* (2013.01); *G01B 9/02027* (2013.01); *G01B 9/02091* (2013.01)

(58) Field of Classification Search
CPC ............ G01B 9/02083; G01B 9/02027; G01B 9/02091

USPC .......................................................... 702/155
See application file for complete search history.

(56) References Cited

U.S. PATENT DOCUMENTS

| | | | | |
|---|---|---|---|---|
| 5,001,724 A | * | 3/1991 | Birgenheier | G01R 23/20 329/304 |
| 5,029,509 A | * | 7/1991 | Serra | G10H 1/125 84/625 |
| 5,671,090 A | * | 9/1997 | Pernick | G06E 3/003 359/561 |
| 6,018,317 A | * | 1/2000 | Dogan | G01S 3/74 342/373 |

(Continued)

FOREIGN PATENT DOCUMENTS

| | | | | |
|---|---|---|---|---|
| WO | WO 2014/068323 | | 5/2014 | |
| WO | WO 2014068323 A1 | * | 5/2014 | ......... G01B 9/02004 |

OTHER PUBLICATIONS

Lei (J. Lei and et al, "A study for polarized illumination effects in photo resist", Proc. SPIE 5853, Photomask and Next Generation Lithography Mask Technology XII, (Jun. 28, 2005); doi: 10.1117/12.617220).*

(Continued)

*Primary Examiner* — Alexander Satanovsky
*Assistant Examiner* — Douglas Kay
(74) *Attorney, Agent, or Firm* — Leason Ellis LLP

(57) ABSTRACT

The present invention related to an apparatus and method for master slave interferometry, referred to as Complex Master Slave (CMS). The method and apparatus can be used to provide complex-valued measurements of a signal reflected from an axial position inside an object or of signals reflected from points at several axial positions inside an object.

20 Claims, 27 Drawing Sheets

(56) References Cited

U.S. PATENT DOCUMENTS

| | | | | |
|---|---|---|---|---|
| 6,215,983 | B1* | 4/2001 | Dogan | G01S 3/74 |
| | | | | 375/324 |
| 8,605,939 | B2* | 12/2013 | Yamamoto | H04N 21/23892 |
| | | | | 380/201 |
| 9,383,187 | B2* | 7/2016 | Podoleanu | G01B 9/02004 |
| 9,955,863 | B2* | 5/2018 | Frisken | A61B 3/0025 |
| 2001/0050758 | A1* | 12/2001 | Suzuki | G02B 5/09 |
| | | | | 353/69 |
| 2002/0044364 | A1* | 4/2002 | Shirasaki | G02B 6/29358 |
| | | | | 359/868 |
| 2006/0203613 | A1* | 9/2006 | Thomsen | G01V 3/083 |
| | | | | 367/38 |
| 2007/0046948 | A1* | 3/2007 | Podoleanu | A61B 3/102 |
| | | | | 356/497 |
| 2008/0152217 | A1* | 6/2008 | Greer | G06K 9/6248 |
| | | | | 382/155 |
| 2013/0235382 | A1* | 9/2013 | Massow | A61B 3/102 |
| | | | | 356/479 |
| 2015/0077760 | A1* | 3/2015 | Koerner | G01B 9/02008 |
| | | | | 356/496 |
| 2015/0215145 | A1* | 7/2015 | Eriksson | H04L 25/03343 |
| | | | | 375/285 |
| 2015/0362330 | A1* | 12/2015 | Omr | G01C 21/14 |
| | | | | 702/160 |

OTHER PUBLICATIONS

A. Bradu and et el, "Imaging the eye fundus with real-time en-face spectral domain optical coherence tomography", 2014 Optical Society of America, vol. 5, No. 41 DOI:10.1364/BOE.5.001233 | Biomedical Optics Express 1233 (Year: 2014).*

A. G. Podoleanu, "Optical coherence tomography", Journal of Microscopy, 2012, Royal Microscopical Society (Year: 2012).*

A. G. Podoleanu and et al, "Master—slave interferometry for parallel spectral domain interferometry sensing and versatile 3D optical coherence tomography", 2013 OSA Aug. 12, 2013,, vol. 21, No. 16, DOI:10.1364/OE.21.019324, Optics Express 19324 (Year: 2013).*

Y. Wantanabe and et al, "Real-time display on SD-OCT using a linear-in-wavenumber spectrometer and a graphics processing unit", Proc. SPIE 7554, Optical Coherence Tomography and Coherence Domain Optical Methods in Biomedicine XIV, 75542S, Feb. 22, 2010; (Year: 2010).*

A. Yang and et al, "Chromatic dispersion compensation of an OCT system with a programmable spectral filter", Proc. of SPIE-OSA Biomedical Optics, SPIE vol. 8091, 809125 © 2011 SPIE-OSA • CCC code: 1605-7422/11/$18 • doi: 10.1117/12.896583 (Year: 2011).*

S. Rivet and et al, "Complex master slave interferometry", 2016 OSA Feb. 8, 2016 | vol. 24, No. 3 | DOI:10.1364/OE.24.002885 | Optics Express 2885 (Year: 2016).*

A. Podoleanu, "Optical coherence tomography", published in Journal of Microscopy, Published Jun. 18, 2012, doi: 10.1111/j.1365-2818.2012.03619.x.

A. Gh. Podoleanu and A. Bradu, "Master-slave interferometry for parallel spectral domain interferometry sensing and versatile 3D optical coherence tomography", published in Opt. Express 21, 19324-19338 (Published Aug. 7, 2013).

A. Bradu and A. Gh. Podoleanu, "Imaging the eye fundus with real-time en-face spectral domain optical coherence tomography", published in Biomed. Opt. Express. 5, 1233-1249 (Published Mar. 19, 2014).

A. Bradu and A. Gh. Podoleanu, "Calibration-free B-scan images produced by master/slave optical coherence tomography", published in Opt. Lett. 39, 450-453 (Published Jan. 20, 2014).

Adrian Bradu, Konstantin Kapinchev, Frederick Barnes, and Adrian Podoleanu, "On the possibility of producing true real-time retinal cross-sectional images using a graphics processing unit enhanced master-slave optical coherence tomography system", published in J. Biomed. Opt., 20(7), 076008 (Jul. 2015).

Adrian Bradu, Konstantin Kapinchev, Frederick Barnes, and Adrian Podoleanu, "Master slave en-face OCT/SLO", published in Biomed. Opt. Express 6, 3655-3669 (Published Aug. 27, 2015).

A. Bradu, M. Maria, A. Gh. Podoleanu, "Demonstration of tolerance to dispersion of master/slave interferometry", published in Opt. Express 23, 14148-14161 (Published May 20, 2015).

* cited by examiner

P= 2
Q= 390

P= 20
Q= 390

P= 390
Q= 390

Q is the number of synthesised complex masks
P is the number of experimetally obtained masks

APPARATUS AND METHOD FOR PROCESSING THE SIGNAL IN MASTER SLAVE INTERFEROMETRY AND APPARATUS AND METHOD FOR MASTER SLAVE OPTICAL COHERENCE TOMOGRAPHY WITH ANY NUMBER OF SAMPLED DEPTHS

CROSS-REFERENCE TO RELATED APPLICATIONS

The present application claims priority under 35 U.S.C. § 119 to British Patent Application No. 1519055.6, filed Oct. 28, 2015, which is hereby incorporated by reference in its entirety.

1. FIELD OF THE INVENTION

The present invention relates to spectral (Fourier) domain interferometry and Master-Slave (MS) interferometry.

2. BACKGROUND AND PRIOR ART

Spectrometer based (Sp) and Swept source (SS) based interferometry and Sp-OCT and SS-OCT are technologies based on analysing the spectrum of the interference signal produced between optical signal from an object under investigation and a local optical reference signal. OCT can produce in real time a cross section image of the object, i.e. a two dimensional (2D) image in the space (lateral coordinate, axial coordinate). The two configurations for Sp-OCT and SS-OCT are described in the article "Optical coherence tomography", by A. Podoleanu, published in Journal of Microscopy, 2012 doi: 10.1111/j.1365-2818.2012.03619.x.

With reference to FIG. 1, in prior art, a Sp or SS interferometer (OCT) system consists mainly in an interferometer, 1, and a decoder, 10, to obtain depth resolved information from an object 13 and deliver a signal 20 as an A-scan. The prior art executes spectral analysis using a Fourier transform (FT) of the electrical signal 100 proportional to the output signal from 10 (not shown in FIG. 1). The spectrum at the interferometer output presents peaks and troughs, and therefore is often referred to as channelled spectrum. The larger the optical path difference in the interferometer, the denser the modulation of the channelled spectrum.

The FT can be written as an integral transformation with a Kernel function K as follows:

$$C(l) = \int_{-\infty}^{+\infty} K(l, v) CS(v) dv \quad (1)$$

and delivers the complex reflectivity C (reflectance and phase) of an object, 13, in depth l. The kernel of FT is defined by $K(l,v)=\mathrm{Exp}[i4\pi l v/c]$, where c is the speed of light. The integral in (1) is performed over a coordinate proportional to the optical frequency, v. Unfortunately, in practice, what is delivered by 10 is not proportional to the optical frequency. In prior art, a FT can only provide reliable results if data is resampled and reorganised in equal frequency slots. For the FT operation to work properly, prior resampling is necessary to provide the channelled spectrum in equal slots of optical frequency. Different hardware and software methods have been reported to alleviate the problem of spectral data not organised linearly.

To eliminate the need of data resampling, Master Slave interferometry and OCT method was suggested that avoids the need for a FT. Such methods and apparatuses have been disclosed in the patent application: Method and Apparatus for Processing the Signal in Spectral Domain Interferometry and Method and Apparatus for Spectral Optical Domain Coherence Tomography, WO/2014/068323, PCT/GB2013/052854, by Adrian Podoleanu and Adrian Bradu. This patent application discloses a method, termed as Master/Slave (MS), that eliminates the need of a FT. In addition, the Master/Slave method allows production of multiple en-face (C-scan) OCT images simultaneously. As seen in FIG. 1, a Master Slave apparatus uses a comparison block 2 that compares the shape of the electrical signal at the decoder 10 output with experimental Masks corresponding to a reference stored version 30$_p$ of the electrical signal output by 10, of a channelled spectrum obtained when a model object was used (instead of the object 13 ). Therefore, a single depth value, A(p), from depths p=1, 2 . . . P of the A-scan is output, 20(p). This operation distinguishes the MS method from the FT conventional method that provides all depth points, A(1), A(2), . . . A(P) of the A-scan in one FT step, i.e. all depths in a single signal. The MS-OCT method opened the avenue of a different type of processing, in parallel, where information from all depths in the object is output in parallel, along different signals (outputs), as shown in more detail in FIG. 2. This peculiar feature of the MS method allows direct parallel production of en-face OCT images from several depths in the object. In FIG. 2, to provide several points in depth from the object 13, along the A-scan, the comparison operation in 2 is repeated in parallel for as many points P of versions of experimental Masks 30(p) stored in a storage block, 3. The interferometer 1 is made up of a beam-splitter, 12, a reference mirror 14, an interface optics 15 that conveys light towards an object subject to tests or imaging 13. In case the application is optical coherence tomography, then the interface optics 15 contains a one or two lateral or transversal galvo-scanner, 151, 152, according to technology known in the art.

The decoder block of the channelled spectrum, 10, translates the channelled spectrum shape at the interferometer output into an electrical signal, 100, and uses two blocks, an optical source 11 and a reader 17. For a spectrometer based configuration, the source 11 is a broadband source 111 and the reader 17 is a spectrometer, 171. For a swept source configuration, the optical source 11 is a narrow tuneable laser 112 and the reader 17 is a fast photodetector, 172. The prior art reports on configurations driven by a broadband source with a spectrometer as reader, are denominated as spectral domain OCT, while configurations using a swept source and a photodetector are denominated as Fourier domain OCT. There are also reports using the terminology the other way around. In what follows we will refer to both types of configurations as spectral domain (SD) OCT for brevity. In prior art before the invention of the MS method, both configurations would deliver the signal output to a Fourier transform block.

The electrical (slave) signal $I_{u,v}$, 100, of the decoder 10 can be represented as a 1D array, $I_{u,v}=\{I_{u,v}(1), \ldots, I_{u,v}(r), \ldots, I_{u,v}(R)\}$, for r=1 to R, where each component $I_{u,v}(r)$, 100(r), corresponds to a resolved pixel in the spectral domain. The (u,v) represent the lateral pixels of the object 13. The minimum number of resolvable pixels is determined by the number of pixels in the linear camera used in the spectrometer 171 or as the number of temporal windows within the sweeping time of the swept source 112, in which case R is usually determined by a digitiser. The prior art based on FT suffers from nonlinear representation of the optical spectrum along the r axis.

We distinguish two types of OCT applications, retina imaging, where the tissue investigated is 13b, behind the eye lens 13a, of the object 13, when rays pivot through 13a to fan over 13b. For skin, eye anterior chamber, industrial applications, and objects of arts, the object is the sample itself, i.e. 13b. When imaging skin, objects of art, etc, as obvious for people skilled in the art, a lens 13a needs to be added to the interferometer to form an image on 13b. For simplicity from now on, the group of lens 13a and object investigated 13b are shown together as 13 and referred to, generically, as the object. Irrespective of cases, eye or skin, the optical path difference is measured up to 13b and the object imaged is practically 13b.

The prior art MS procedure operates in two stages:

Master Stage:

An object model is used and channelled spectra termed as experimental Masks are acquired and deposited in a storage of Masks. The model object is a lens (to simulate the eye lens 13a) plus a mirror (to simulate the retina 13b) for retina imaging, while for skin, eye anterior chamber and industrial applications, the model object is a mirror only (FIG. 1). The Masks are acquired for a set P, of optical path difference (OPD) values in the OCT interferometer.

Slave Stage:

The object to be investigated replaces the model object and channelled spectra acquired are compared with the set of experimental Masks in the storage. Instead of a FT, the prior art MS method uses a comparison block 2. This uses P comparators $21(p)$, p=1, 2, ... P to produce signal $20(p)$, made from many outputs $A_{u,v}(p)$, each representing a reflectance value from a depth p in the object 13, for each pixel (u,v) in the two lateral directions across the object, with u=1, 2, ... U and v=1, 2, ... V. The outputs $A_{u,v}(p)$ are obtained by comparing the electrical signal proportional to the shape of Channelled Spectra 100 with the signal provided by a Storage of Masks 3, delivering signal $30(p)$ to each comparator $21(p)$, by reading each Mask $30(p)$. The parallel provision of depth information along separate signals, allows simultaneous generation of en-face OCT images, as shown in FIG. 3. A-scans can also be produced, as shown in FIG. 4 for any pixel such as $(u_0,v_0)$ in the two lateral directions across the object, by putting together the collection of outputs $A_{u0,v0}(1)$, $A_{u0,v0}(2)$, ..., $A_{u0,v0}(P)$ signals. For each experimental mask, a comparison operation delivers a point from the OPD value used to acquire the respective mask, so P points in depth from the object are delivered that can be used to build an A-scan (as shown in FIG. 4).

In fact, in the spirit of the MS method, the Kernel K(l,v) in Eq. (1) can be seen as a Mask that interrogates the electrical signal CS 100 for a depth l. However, in the prior art of MS technology, disadvantageously, the phase of the final signal was discarded as only shapes of channelled spectra were compared.

In what follows, OPD and depth will be used interchangeably. When measured in air, the OPD is considered equal to double the value of depth. When referring to a mirror, such as to the model object, reference will be made to OPD, as it does not make sense to refer to depth here. However, different points in depth in the object, each correspond to equivalent values of OPD, made from the OPD parts measured in air plus the double of the depth value multiplied by the object index of refraction.

The prior art MS method has been employed, according to the teaching of the PCT patent application mentioned above, in generating multiple en-face OCT images (C-scans) from retina and skin as, further explained in "Master-slave interferometry for parallel spectral domain interferometry sensing and versatile 3D optical coherence tomography," by A. Gh. Podoleanu and A. Bradu, published in Opt. Express 21, 19324-19338 (2013) and in the paper "Imaging the eye fundus with real-time en-face spectral domain optical coherence tomography, by A. Bradu and A. Gh. Podoleanu, published in "Biomed. Opt. Express. 5, 1233-1249 (2014).

The MS method has been also employed to generate cross section OCT images (B-scans), as reported in "Calibration-free B-scan images produced by master/slave optical coherence tomography," by A. Bradu and A. Gh. Podoleanu, published in Opt. Lett. 39, 450-453 (2014).

The parallel feature of the MS method has been exemplified on the use of graphic cards in the paper "On the possibility of producing true real-time retinal cross-sectional images using a graphics processing unit enhanced master-slave optical coherence tomography system," by Adrian Bradu, Konstantin Kapinchev, Frederick Barnes, and Adrian Podoleanu, published in J. Biomed. Opt., 20(7), 076008 (2015).

Its parallel feature was exemplified in generating both C-scans and B-scans in imaging the eye in the paper, "Master slave en-face OCT/SLO," by Adrian Bradu, Konstantin Kapinchev, Frederick Barnes, and Adrian Podoleanu, published in Biomed. Opt. Express 6, 3655-3669 (2015).

However, the method and apparatuses protecting the prior art MS technology, disclosed in the PCT patent, FIGS. 1 and 2 and papers listed above, present several disadvantages such as:

1. The MS operation is based on a comparison of channelled spectra shapes. Phase has been discarded, while phase is important in flow and polarisation analysis to name only a few of applications.
2. To avoid the problem of phase variation (random phase) from the moment the experimental Masks were acquired at the Master stage until used at the Slave stage, the comparison operation is repeated for several lag values of wavenumber. This equates to an integral over wavenumber lag space that leads to deterioration of axial resolution achieved.
3. The number of en-face images and of points in the A-scans is limited to the number of experimentally collected Master Channelled Spectra at the Master stage, i.e. limited to P. In case the bandwidth of the broadband source in Sp-OCT is over hundreds of nm, or the tuning bandwidth of the swept source in SS-OCT is over hundreds of nm, as required by high axial resolution OCT, a huge number of experimental channelled spectra need to be acquired. This may lead to a long time consuming Master stage.
4. The limitation of number of depths in the final A-scan or of depths of C-scan images leads to under-sampling, unless a sufficient corresponding number of Master Channelled Spectra are acquired at the Master stage.
5. Also, there are configurations, such as for endoscopy, or configurations with all reference path in fibre that may not allow collection of any experimental channelled spectra to be used as masks or such a collection requires addition of devices such as translations stages, otherwise not needed.
6. To improve the resolution and the decay of the sensitivity with depth, the model presented in the paper by A. Bradu, M. Maria, A. Gh. Podoleanu, "Demonstration of tolerance to dispersion of master/slave interferometry", published in Opt. Express 23, 14148-14161 (2015) suggests elimination of envelope of the channelled spectrum modulation by division of Master Channelled Spectra acquired at the Master stage by the power spectrum of the optical source used (the usual Gaussian shape). Then, all such experimental Masks obtained, present the same constant amplitude, in an attempt to enhance sensitivity and axial resolution. However, division operation is known to introduce noise and even more, to avoid the problem of division by small numbers, the spectrum is narrowed, leading to a worse axial resolution.

7. In order to compensate for the dispersion in the object, the prior MS art proposes to use slabs of similar material as the object at the Master stage. For instance, if the object is the retina, then a 2 cm water cuvette may be used in the model object. However, if dispersion of the retina is to be compensated for, slabs of material similar to the retina are needed, cut at thicknesses required by the steps at the Master stage. This is rather difficult, to provide hundreds of such slabs, of the same material as that investigated.

Therefore, there is a need to develop apparatuses and methods to restore, or process the phase, to eliminate the effect of random phase, simplify the Master stage operation, to allow production of C-scans and points of A-scans from any point in depth, irrespective of the depths used at the Master stage, and compensate for dispersion in the object without any slab in the model object.

There is also a need for elimination of amplitude dependence of the experimental masks on the wavenumber, dependence that in previous reports of MS implementations, translates in limitation of the achievable axial resolution and decrease of sensitivity with depth.

There is also a need to perform the MS method on OCT systems where there is difficult or impossible to acquire channelled spectra to be used as masks.

3. SUMMARY OF THE INVENTION

The invention provides embodiments and methods, that can be used to provide complex-valued measurements of a signal reflected from an axial position inside an object or of signals reflected from points at several axial positions inside an object. We therefore refer to the novel method disclosed here as Complex Master Slave (CMS). Embodiments are disclosed where axial complex-valued profiles are created with no need for data resampling. In the signal processing, procedures are employed that avoid performing a Fourier transform of the spectrum. A method is disclosed that can be used to measure reflectance and phase profiles in depth, that can be subsequently used for medical analysis, flow and polarization characterisation or in sensing applications. Embodiments of apparatuses and methods are disclosed where the number of depths simultaneously sampled is independent on the number of measurements initially performed on a model object, by creating a function that can generate any reference signals for the CMS method as desired by the user. Embodiments and methods are disclosed that can generate reference signals from a minimal number of experimentally collected channelled spectra at the interferometer output, or none. The embodiments and methods disclosed allow producing any number of en-face optical coherence tomography (OCT) images from as many depths as desired and axial complex-valued A-scan profiles with any density of depths. Embodiments and methods disclosed allow elimination of random phase cumulated from the moment spectra were acquired from the model object, until measurements are done on the object under study. Embodiments and methods are disclosed where the depth dependent dispersion introduced by the object is eliminated.

In a first aspect, the present invention is about a new Master Slave method and embodiments that process complex signals. Complex Master Slave (CMS) embodiments and methods are disclosed that compare the channelled spectra obtained from the object with Synthesised Masks that are complex and built from the experimentally channelled spectra acquired at the Master stage. The preparation of these Synthesised Complex Masks conserves the phase, therefore the novel method can from now on, be applied to phase signal processing. This opens wide perspectives in employing the CMS in phase sensitive OCT, flow measurements, etc.

In a second aspect, the present invention discloses apparatuses and methods to implement CMS interferometry and CMS-OCT, that reduce the effect of phase variation (random phase) from the moment the experimental channelled spectra (called from now on Master Channelled Spectra) were acquired at the Master stage until the comparison operation is done.

In a third aspect, the present invention discloses apparatuses and methods where the number Q of en-face images and of Q points in the A-scans produced is independent from the P number of experimentally collected Master Channelled Spectra at the Master stage. As disclosed further below, at a Preparation stage, two arrays, G and H, are inferred. The array G incorporates the chirp of the channelled spectrum output of the interferometer. The chirp is due to the nonlinearity in the spectrometer in Sp interferometry and Sp-OCT or due to nonlinearities appearing during the tuning of the swept source in SS interferometry and SS-OCT. The array H is responsible for that chirp in the channelled spectrum 100 that is due to unbalanced dispersion in the interferometer. As disclosed below, at a Preparation stage, using the arrays G and H, the Synthesised Complex Masks are generated from any desired depth in the object, 13, independent of the OPD values where the Master Channelled Spectra were acquired from at the Master stage, as disclosed further below. When interrogating an object made from a succession of layers, the measuring interferometer 1 (at this stage termed as Slave interferometer) selects that depth from the object 13 determined by the OPD of the Synthesised Complex Masks used, independently from and at a depth equal to or different from the OPD value of Master Channelled Spectra acquired at the Master stage.

In a fourth aspect, the present invention discloses apparatuses and methods to reach the axial resolution dictated by the optical bandwidth of the source 111 or of the tuning range of the swept source 112, independently from the number P of Master Channelled Spectra acquired at the Master stage.

In a fifth aspect, the present invention discloses apparatuses and methods that can produce the Synthesised Complex Masks even in configurations where collection of Master Channelled Spectra is difficult or where a very small number of Master Channelled Spectra can be acquired, such as for endoscopy or configurations with all reference path in fibre. For such cases, the invention discloses apparatuses and methods where the Synthesised Complex Masks are generated by an iterative protocol of optimising the final signal.

In a sixth aspect, the invention discloses apparatuses and methods where the spectral envelope of the Synthesised Complex Masks is eliminated without resorting to the division operation, where all the Synthesised Complex Masks are made of equal strength with immediate consequence, improvements in both the axial resolution and decay of sensitivity with depth.

In a seventh aspect the invention discloses several apparatuses and methods to perform compensation of dispersion in the object by: (i) including theoretical values of dispersion characterising the object material in the calculation of the Synthesised Complex Masks, i.e. without modifying the experimental model object; (ii) using a limited number of slabs with dispersion similar to that of the object to be investigated, in the model object, to determine corrected G and H arrays that depend on the depth resolved dispersion imprinted by the object; (iii) using an iterative process, where in closed loop, information from the image (or sensor in sensing applications), feeds the generation of G and H in order to maximise the contrast of the depth profile of the object in the Slave interferometer and achieve the maximum axial resolution throughout all axial range.

4. BRIEF DESCRIPTION OF THE DRAWINGS

The features which are believed to be characteristic of the present invention, as to its structure, organization, use and method of operation, together with further objectives and advantages thereof, will be better understood from the following drawings in which preferred embodiments of the invention will be illustrated by ways of example. It is expressly understood, however, that the drawings are for the purpose of illustration and description only and are not intended as a definition of the limits of the invention. Embodiments of this invention will now be described in association with the accompanying drawings in which:

Figure 13:
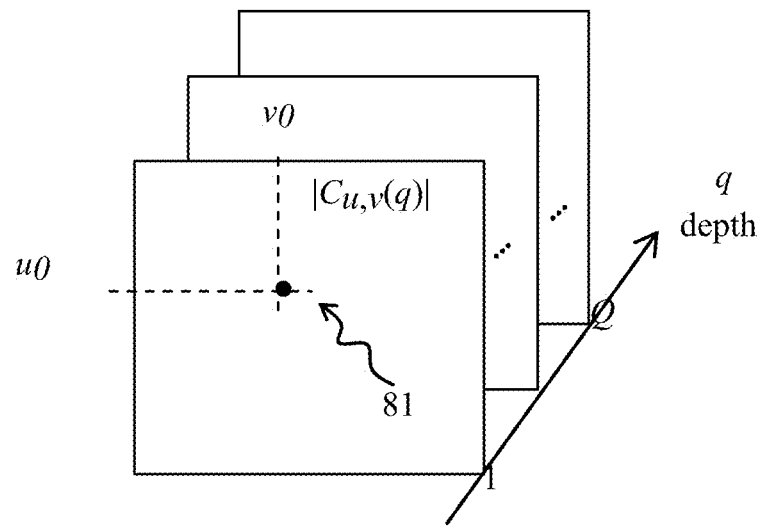
Figure 14:
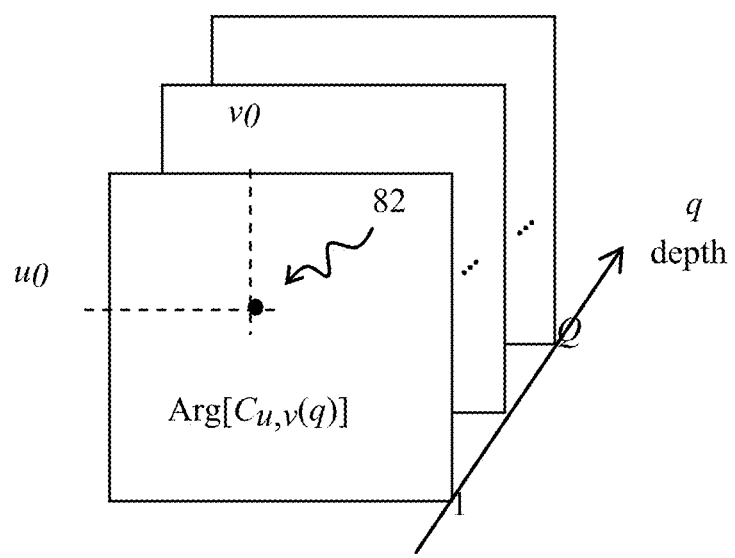
Figure 15:
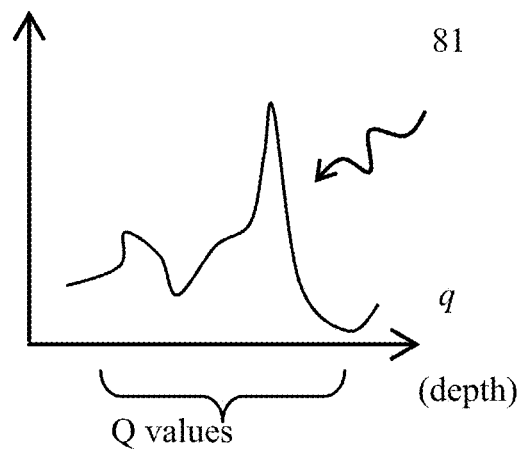

FIG. 13 shows the delivery of C-scans (en-face) OCT images proportional with the modulus of the interference signal along depth, according to the invention FIG. 14 shows the delivery of phase maps in the form of C-scans (en-face) OCT images along depth, according to the invention FIG. 15 shows the delivery of A-scan profiles proportional to the modulus of the interference signal, along depth, according to the invention.

Figure 16:
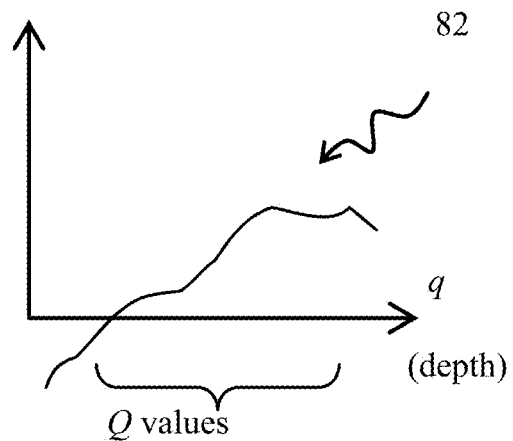

FIG. 16 shows the delivery of A-scan profiles of the phase along depth, according to the invention.

Figure 17:
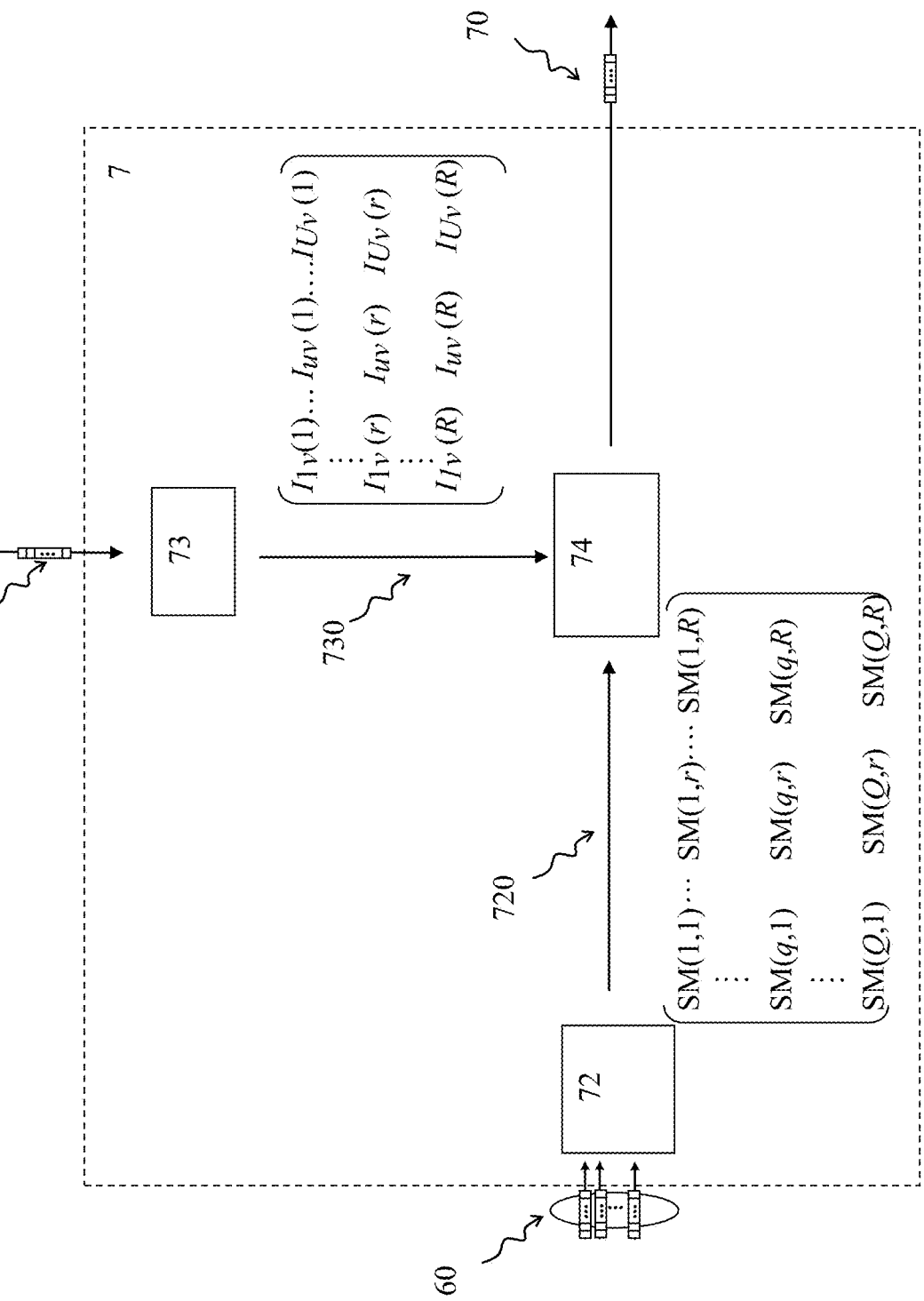

FIG. 17 shows an embodiment for the Reflectivity Calculator, 7, of the CMS interferometry (OCT) method at the Slave stage according to the invention.

Figure 18:
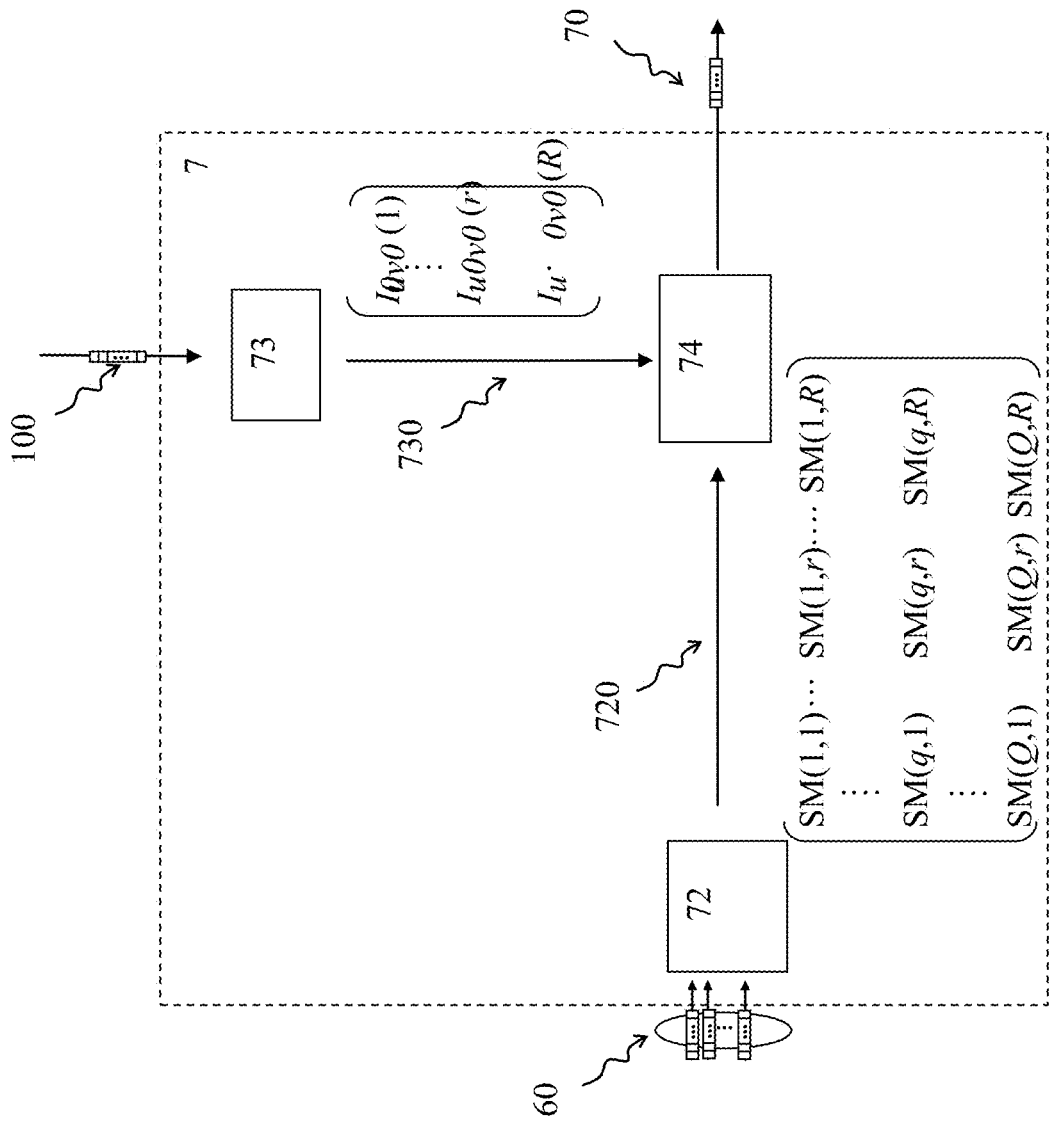

FIG. 18 shows another embodiment of the Reflectivity Calculator, 7, of the CMS interferometry (OCT) method at the Slave stage according to the invention.

Figure 19:
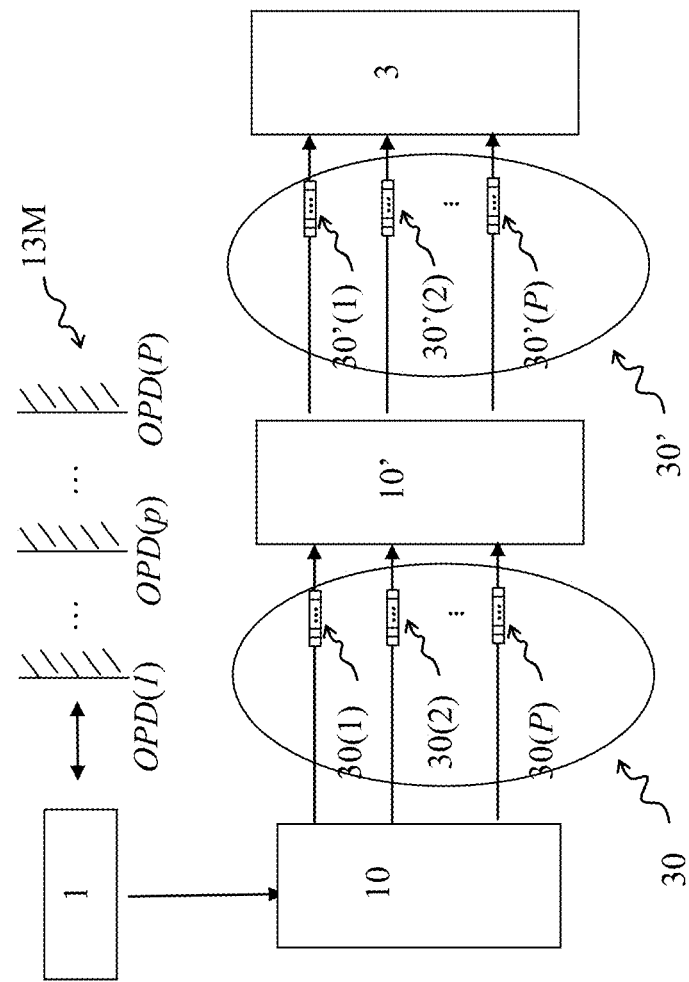
Figure 20:
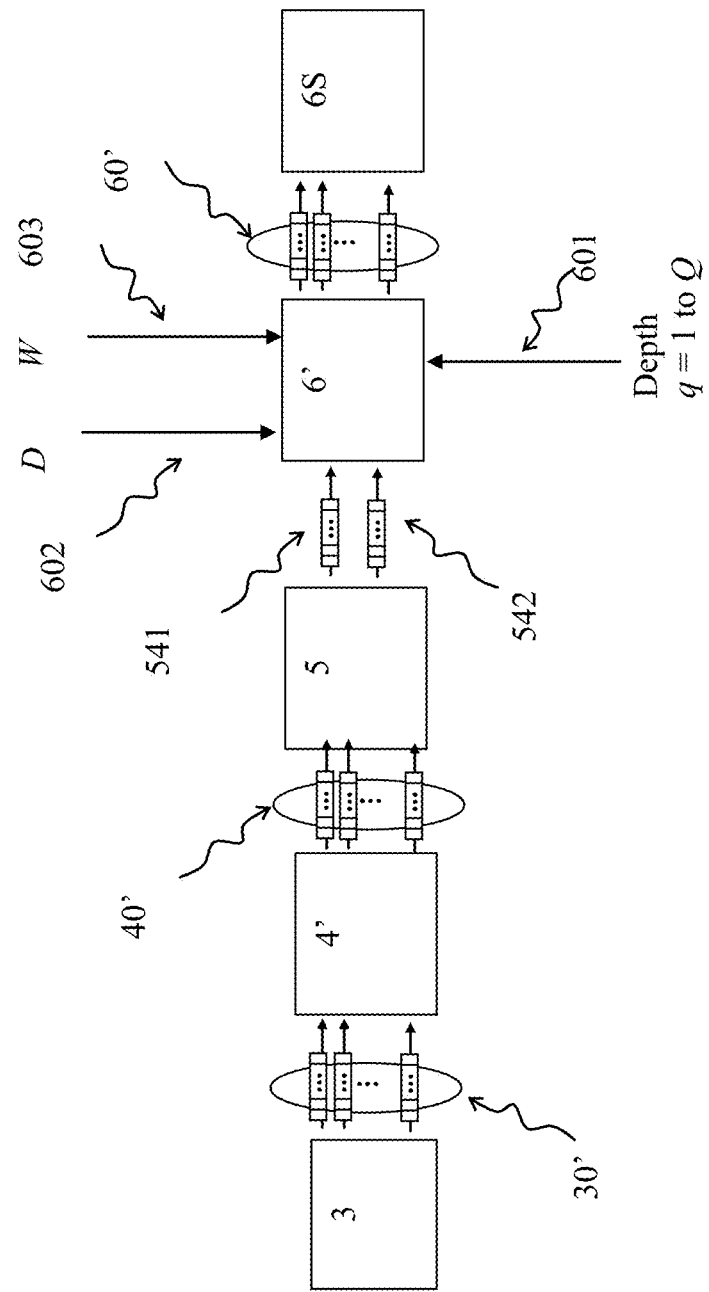
Figure 21:
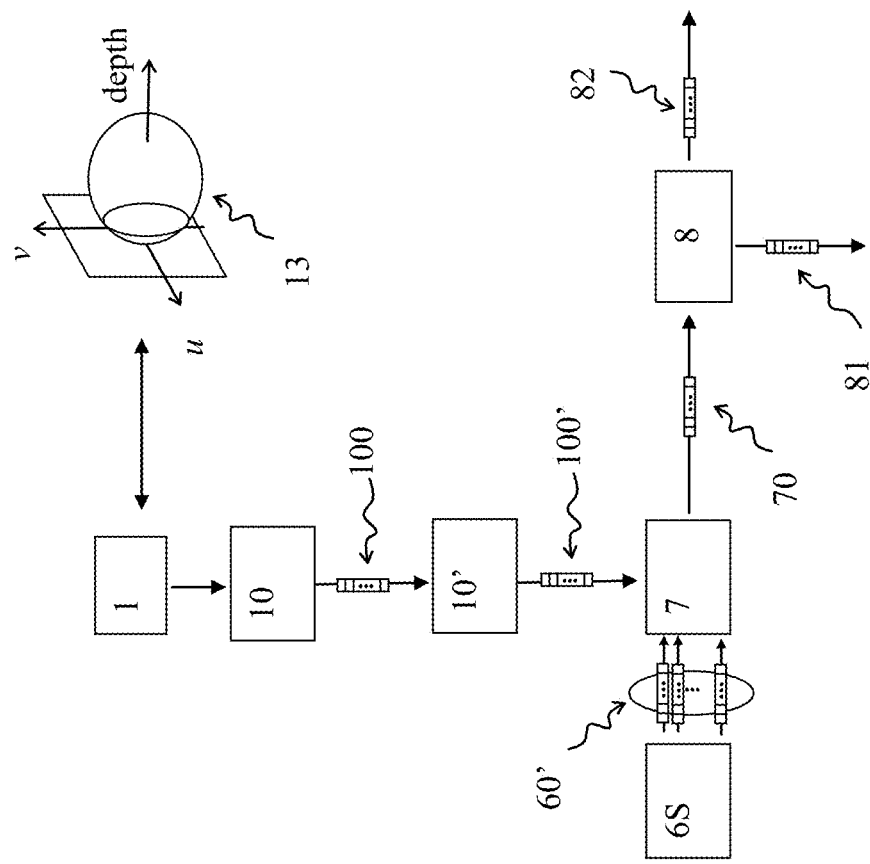

FIG. 19 shows in diagrammatic form, blocks of the invention at the Master stage when the signal delivered by the decoder 10 is subject to a Fourier transform FIG. 20 shows in diagrammatic form, blocks of the invention at the Preparation stage. compatible with the signal delivered by the decoder 10 being subject to a Fourier transform FIG. 21 shows in diagrammatic forms, blocks of the invention at the Slave stage. compatible with the signal delivered by the decoder 10 being subject to a Fourier transform.

Figure 22:
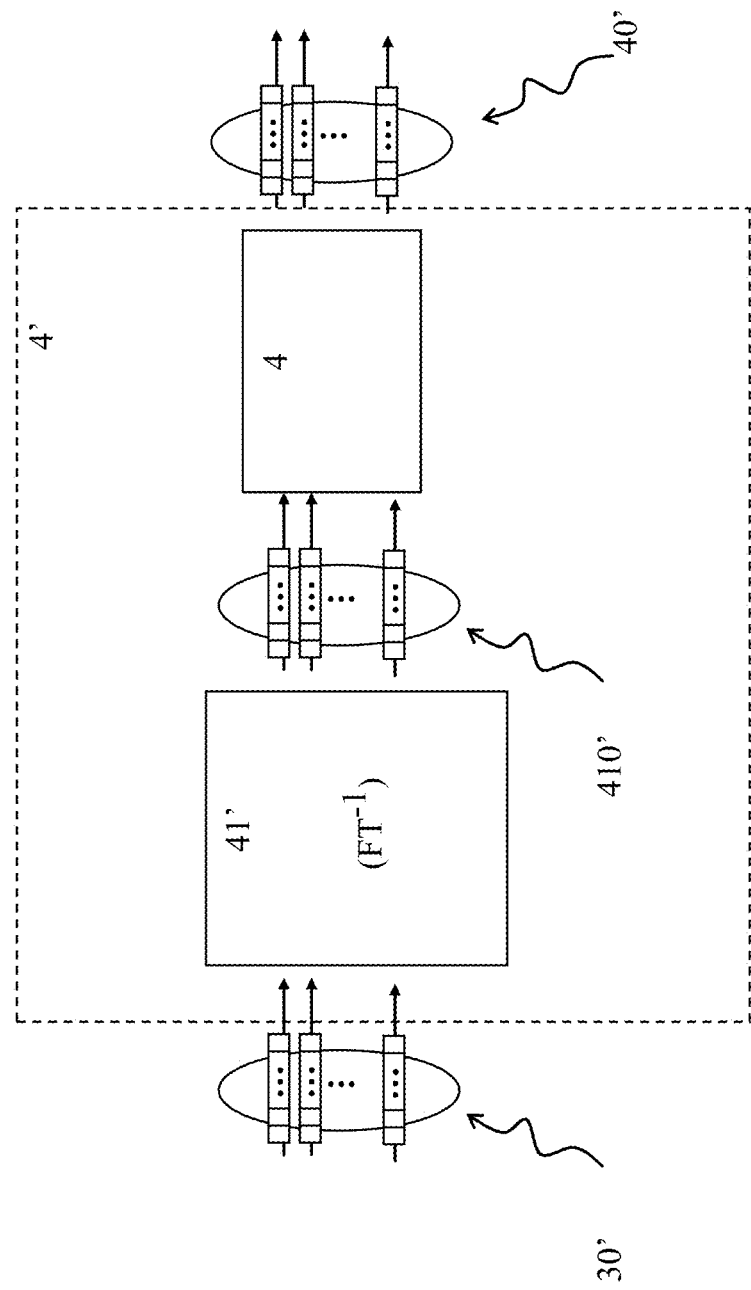

FIG. 22 details the Phase Recovery Calculator, 4', of the CMS interferometry (OCT) method according to the invention, when using the Fourier Transform of the Slave signal.

Figure 23:
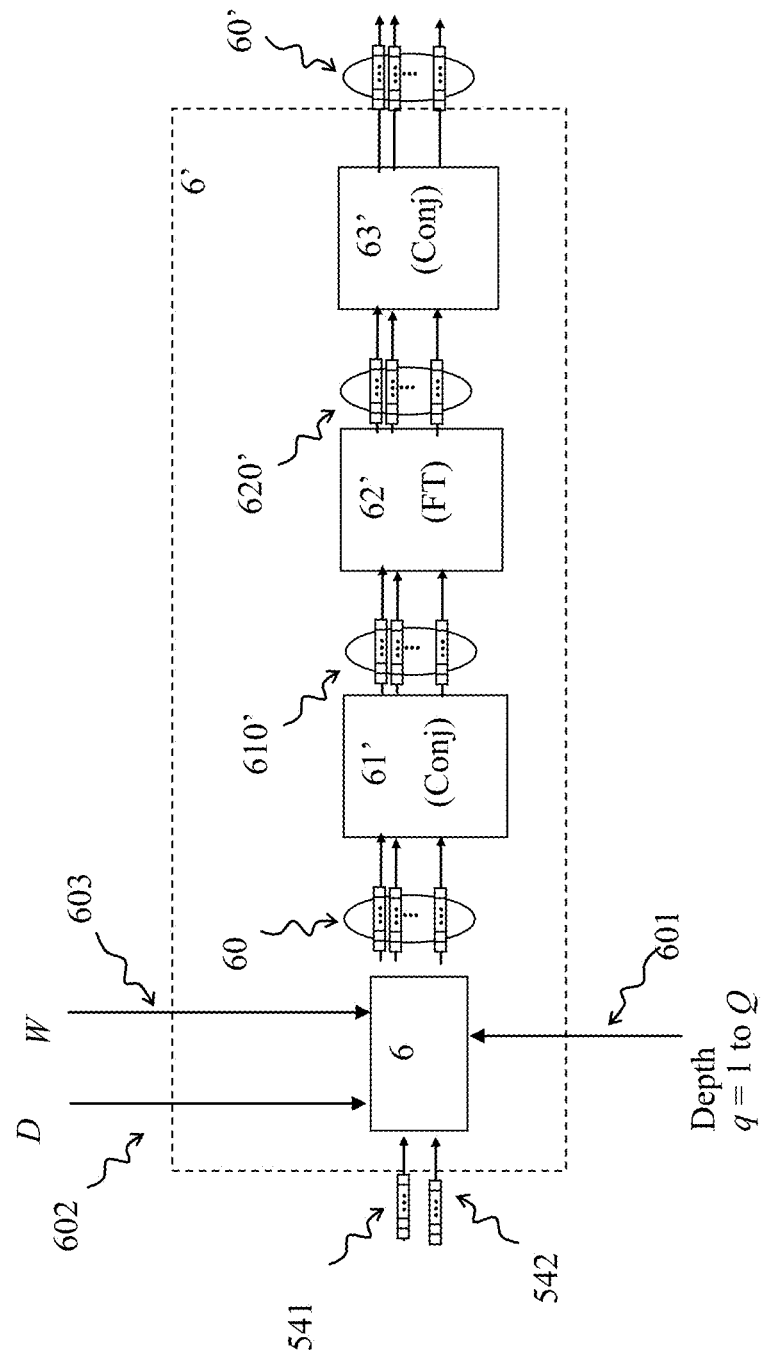

FIG. 23 details the Mask Generator 6', of the CMS interferometry (OCT) method according to the invention, when using the Fourier Transform of the Slave signal.

Figure 24:
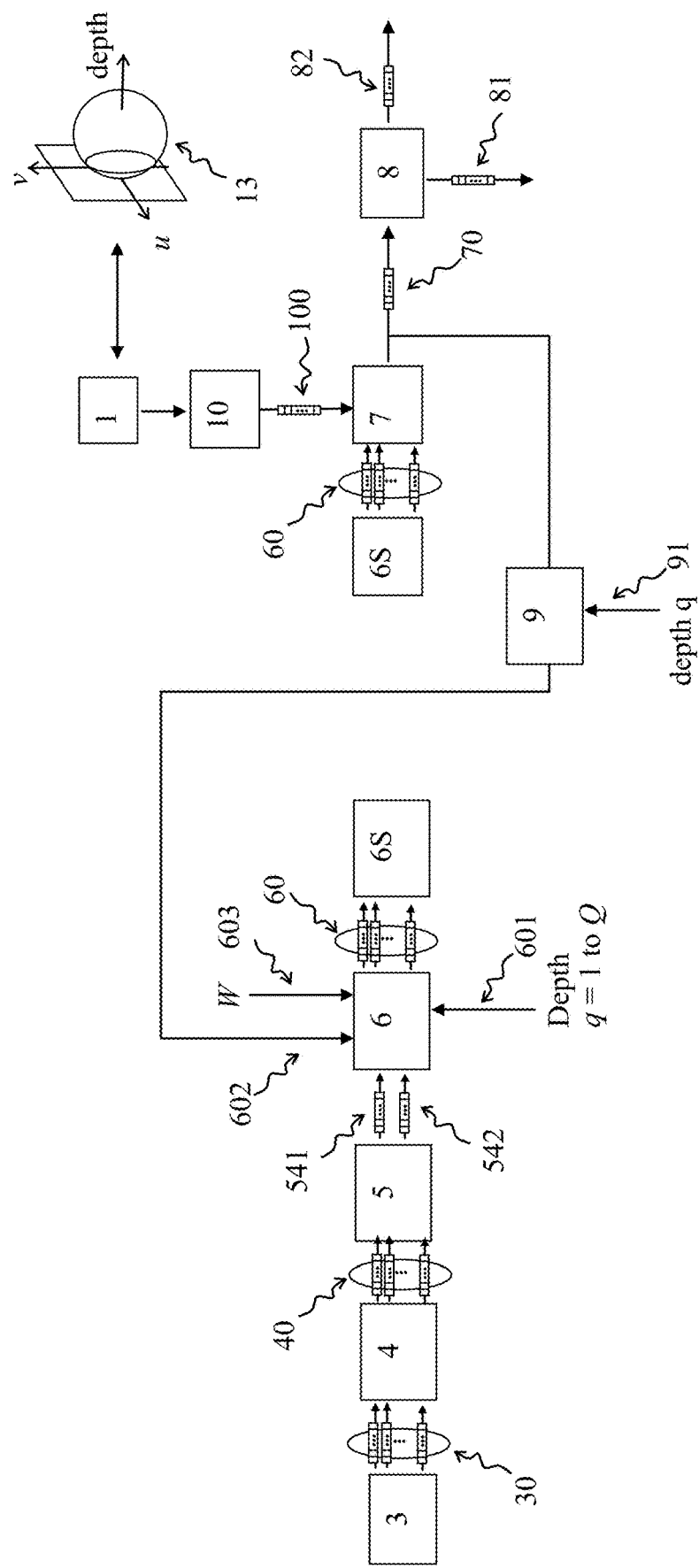

FIG. 24 discloses in diagrammatic form another embodiment of the CMS interferometry (OCT) method according to the invention, with an adaptive correction dispersion loop.

Figure 25:
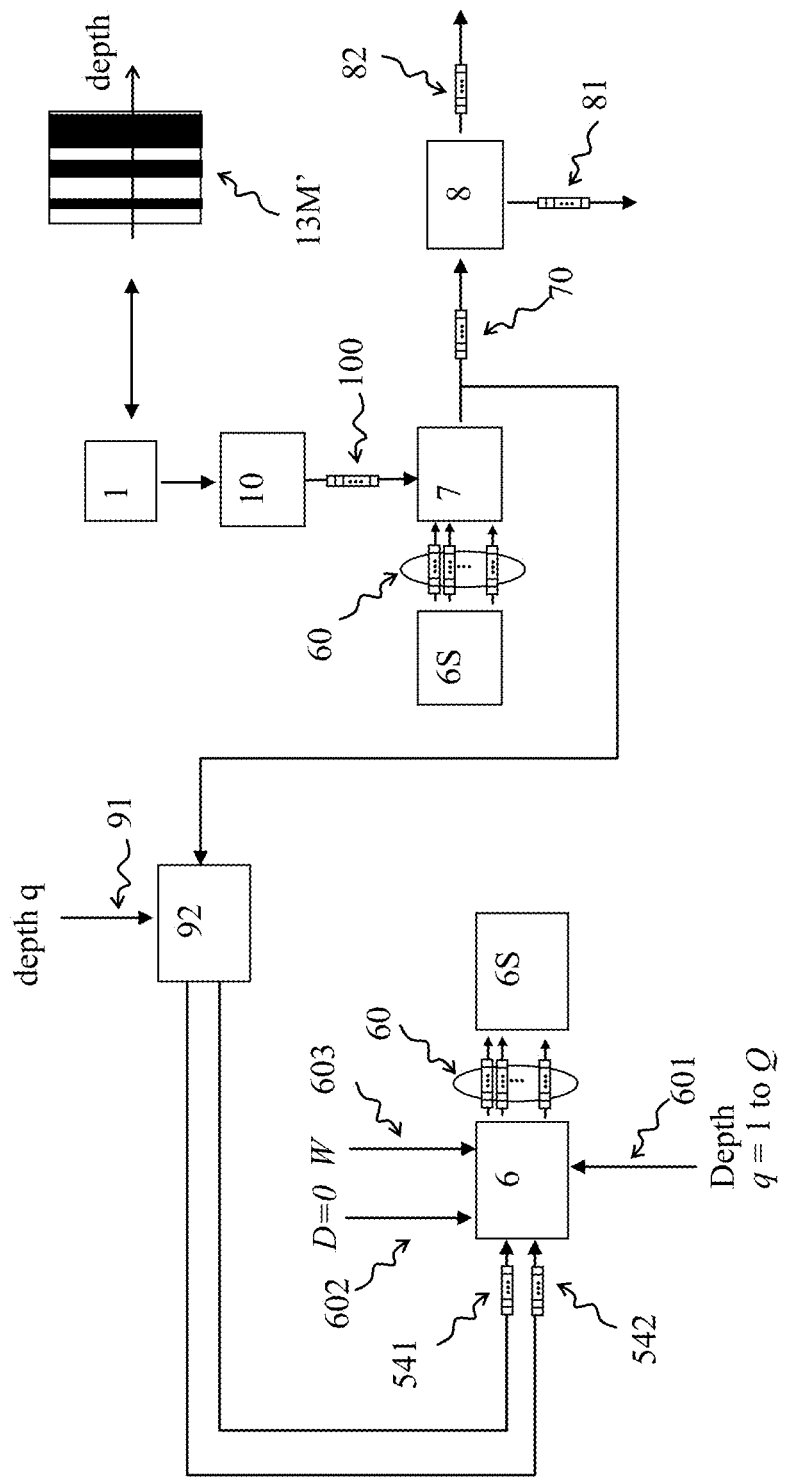
Figure 26:
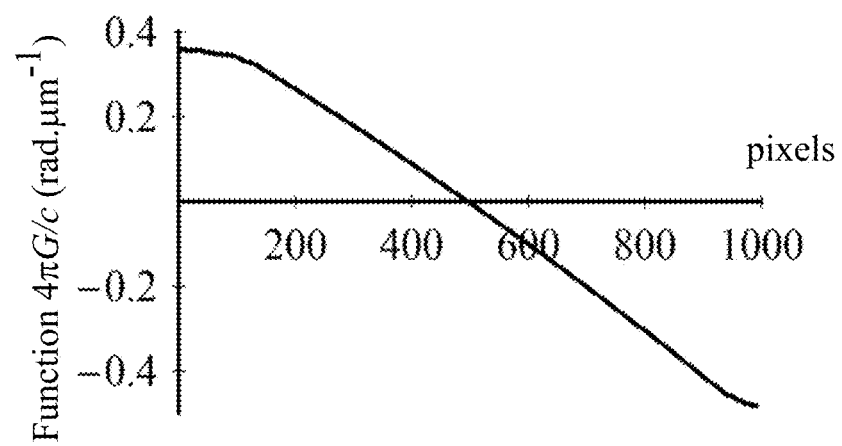

FIG. 25 shows in diagrammatic form another embodiment of the CMS interferometry (OCT) method according to the invention, for a dynamic iterative correction of G and H in a closed loop procedure at the Master stage FIG. 26 shows experimental results for G.

Figure 27:
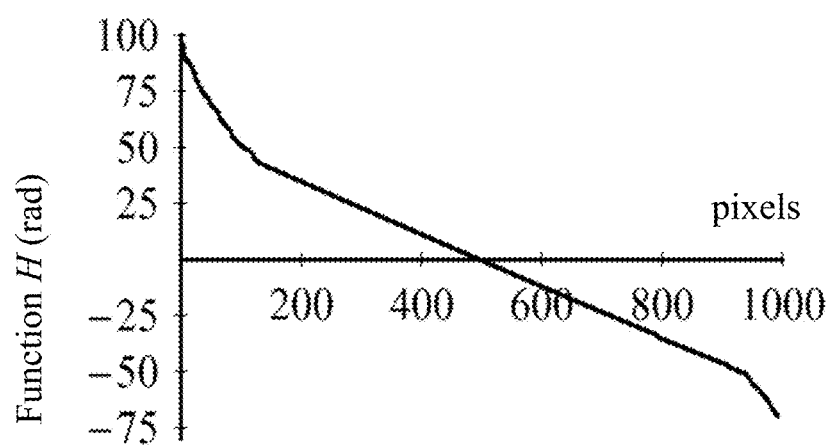

FIG. 27 shows experimental results for H.

Figure 28:
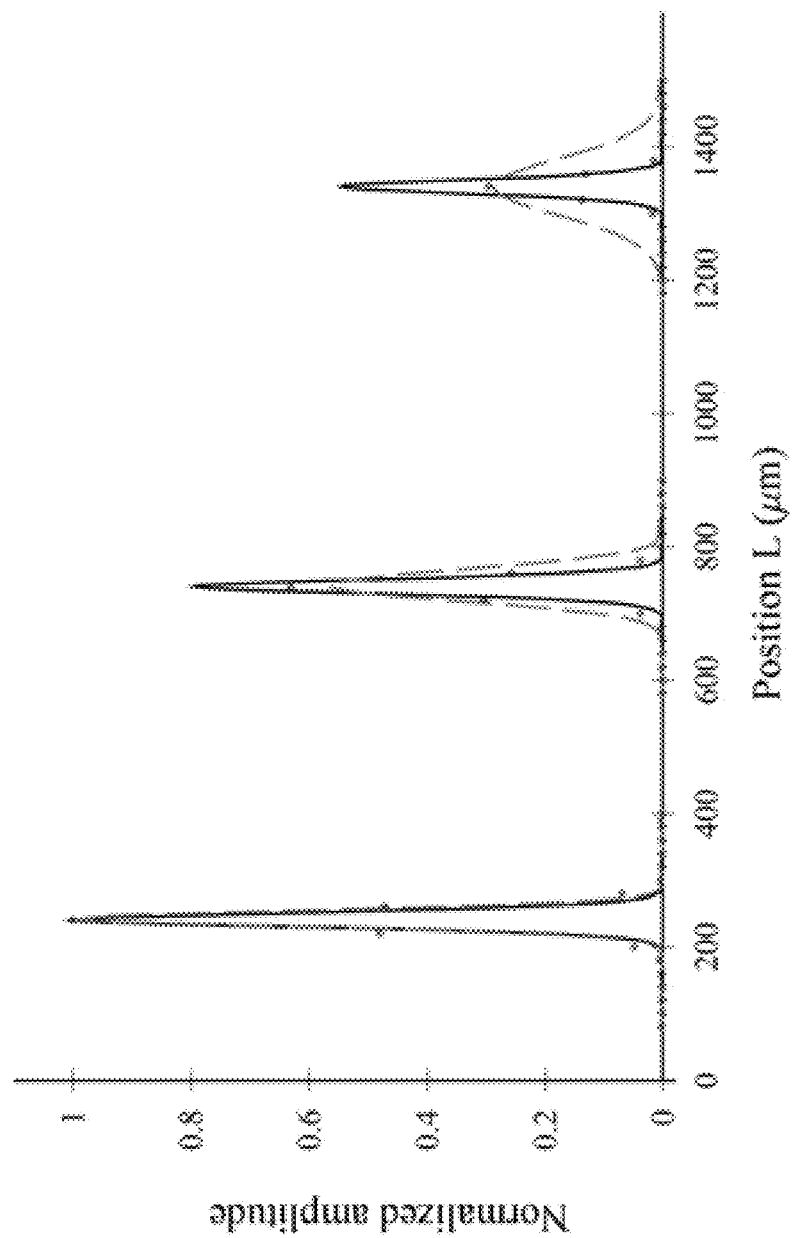

FIG. 28 shows experimental results obtained with the CMS method regarding the resolution and the drop-off.

Figure 29:
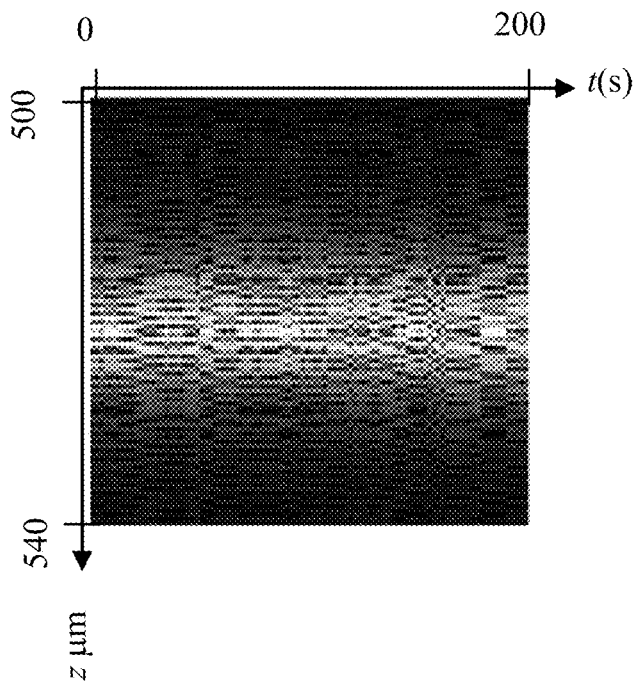

FIG. 29 shows experimental results obtained with the prior art MS method regarding the effect of the random phase on the stability of the A-scans.

Figure 30:
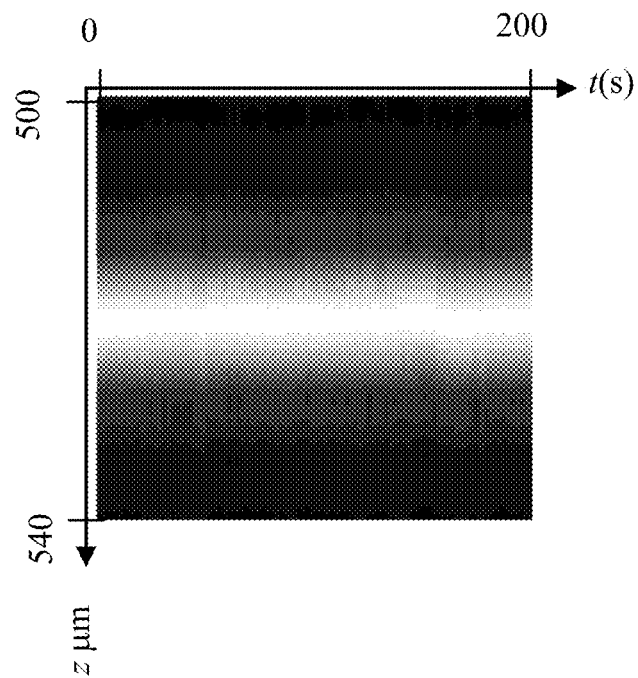

FIG. 30 shows experimental results obtained with the CMS method, demonstrating improved stability to the random phase on the A-scans.

Figure 31:
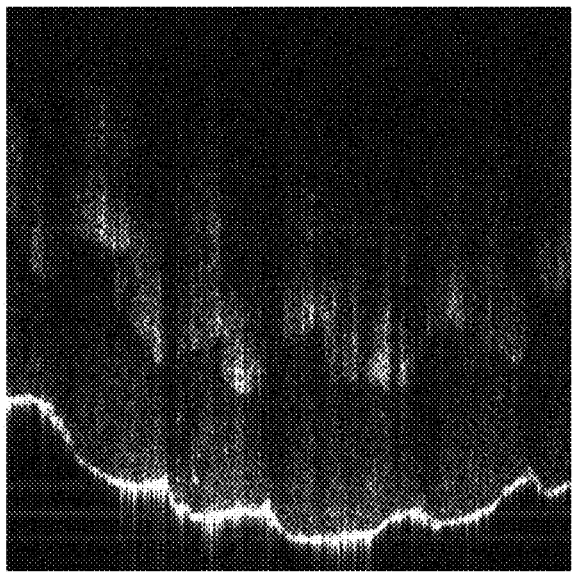

FIG. 31 shows an experimental B-scan obtained with the CMS method without any windowing applied.

Figure 32:
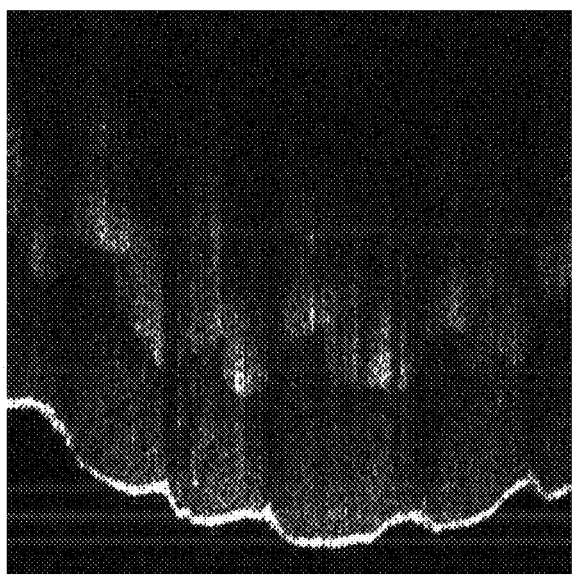

FIG. 32 shows improved B-scan obtained with the CMS method, by using a Hamming window W.

Figure 33:
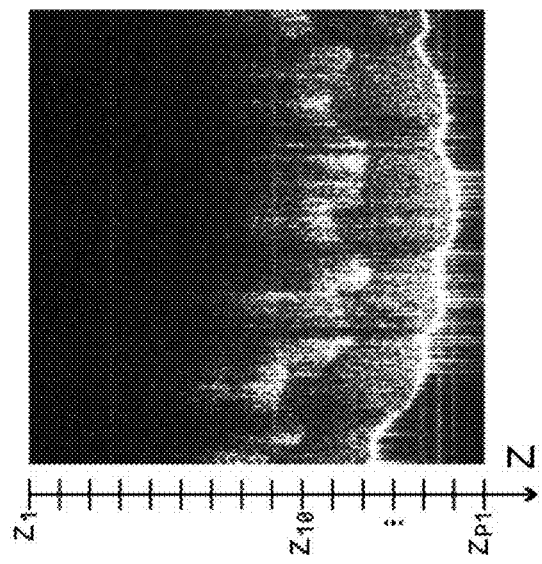

FIG. 33 shows a B-scan obtained with the CMS method using a small number P of Master Channelled Spectra acquired at the Master stage on the B-scan produced at the Slave stage.

Figure 34:
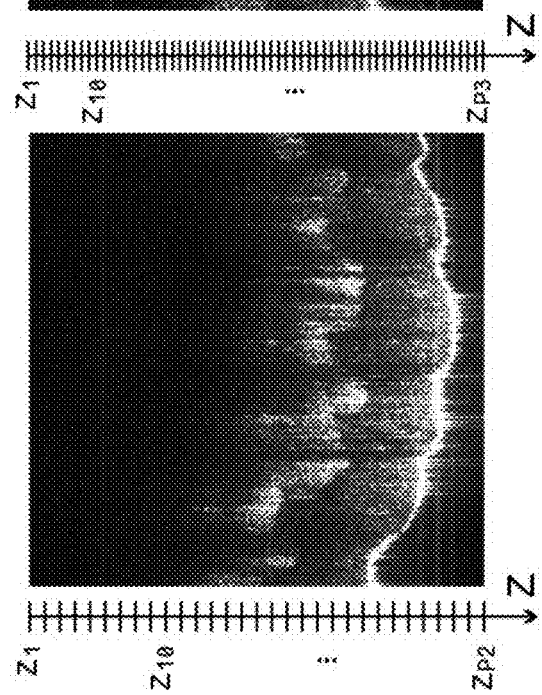

FIG. 34 shows a B-scan obtained with the CMS method using a medium number P of Master Channelled Spectra acquired at the Master stage on the B-scan produced at the Slave stage.

Figure 35:
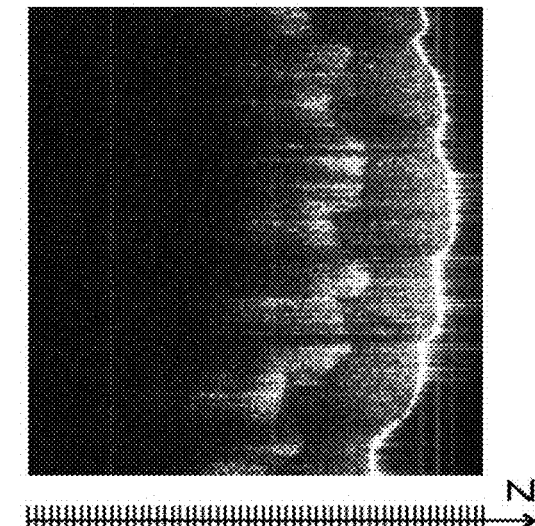

FIG. 35 shows a B-scan obtained with the CMS method using a large number P of Master Channelled Spectra acquired at the Master stage on the B-scan produced at the Slave stage.

5. DETAILED DESCRIPTION OF THE PREFERRED EMBODIMENTS

Various features of the present invention, as well as other objects and advantages attendant thereto, are set forth in the following description and the accompanying drawings in which like reference numerals depict like elements.

The invention discloses apparatuses and methods that rely on the measurement of the reflectance and the phase of signal returned from an object, from a depth defined by the user, for which the user defines a dispersion function to compensate partially the dispersion of the object.

The prior art MS method proceeded along two main stages, Master stage) and (Slave stage. However here, the invention improves on the 7 disadvantages of the MS method mentioned. To implement the 7 new aspects listed, due to the fact that the experimental measurements of channelled spectra are not directly used as masks, this requires an intermediate stage before measurements (imaging). Additionally, CMS needs to perform dynamic adjustment of parameters during imaging. This requires supplementary processing during measurements (imaging). Therefore, we distinguish: 1. A Master stage, 2. A Preparation stage and 3. A measurement or imaging stage, referred from now on as a Slave stage.

Figure 5:
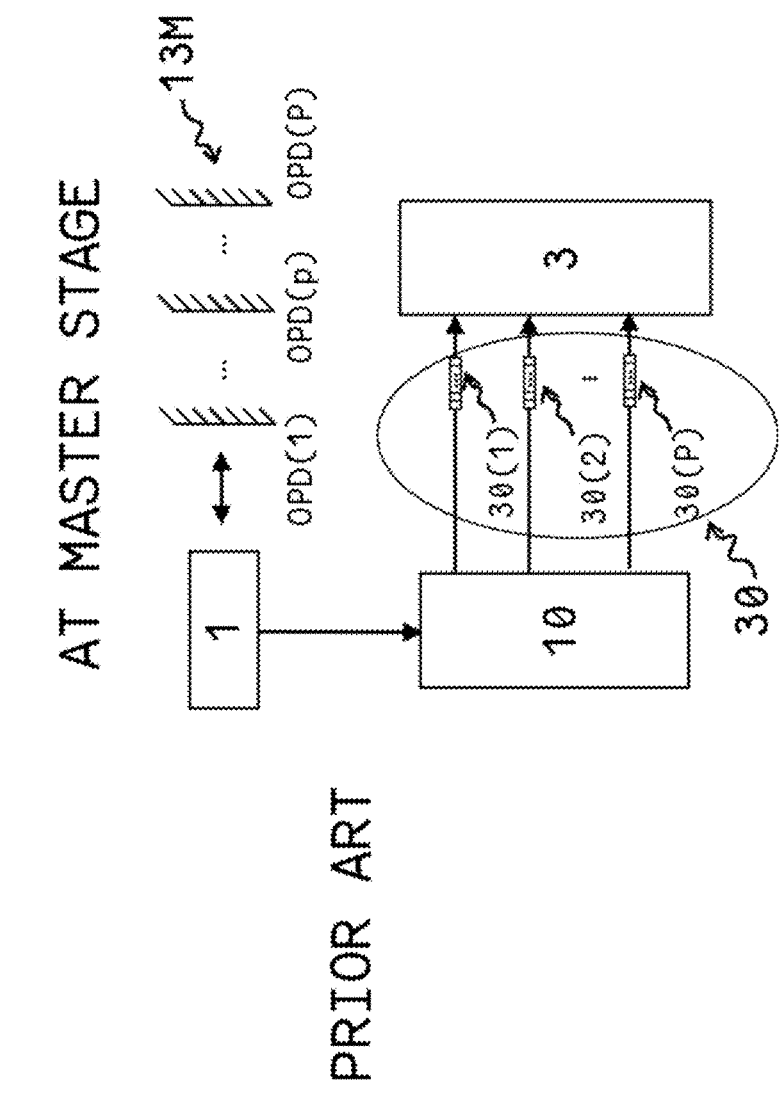
FIG. 5 shows in diagrammatic form, blocks employed at the Master stage
Figure 6:
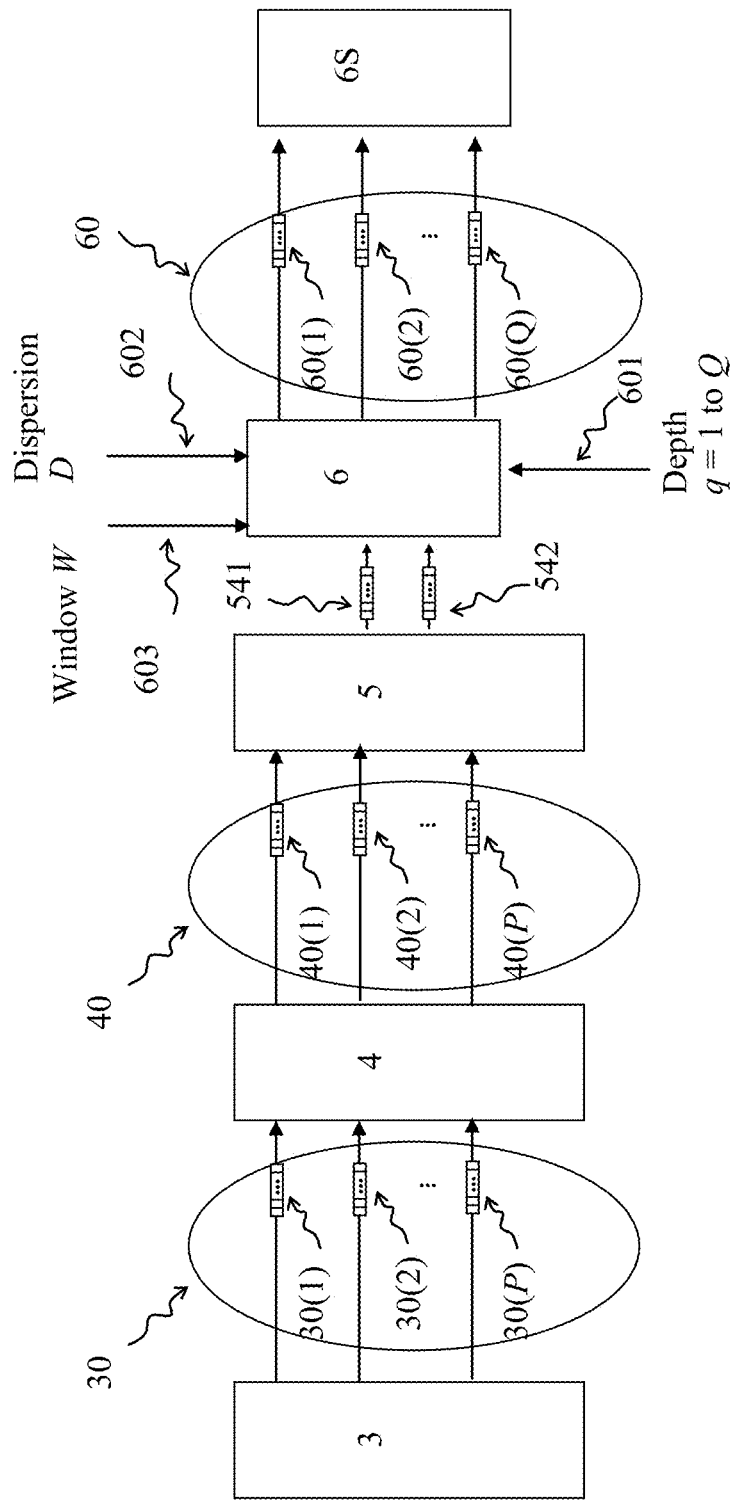
FIG. 6 shows in diagrammatic form, a first embodiment of the invention, with blocks used at the Preparation stage.
Figure 7:
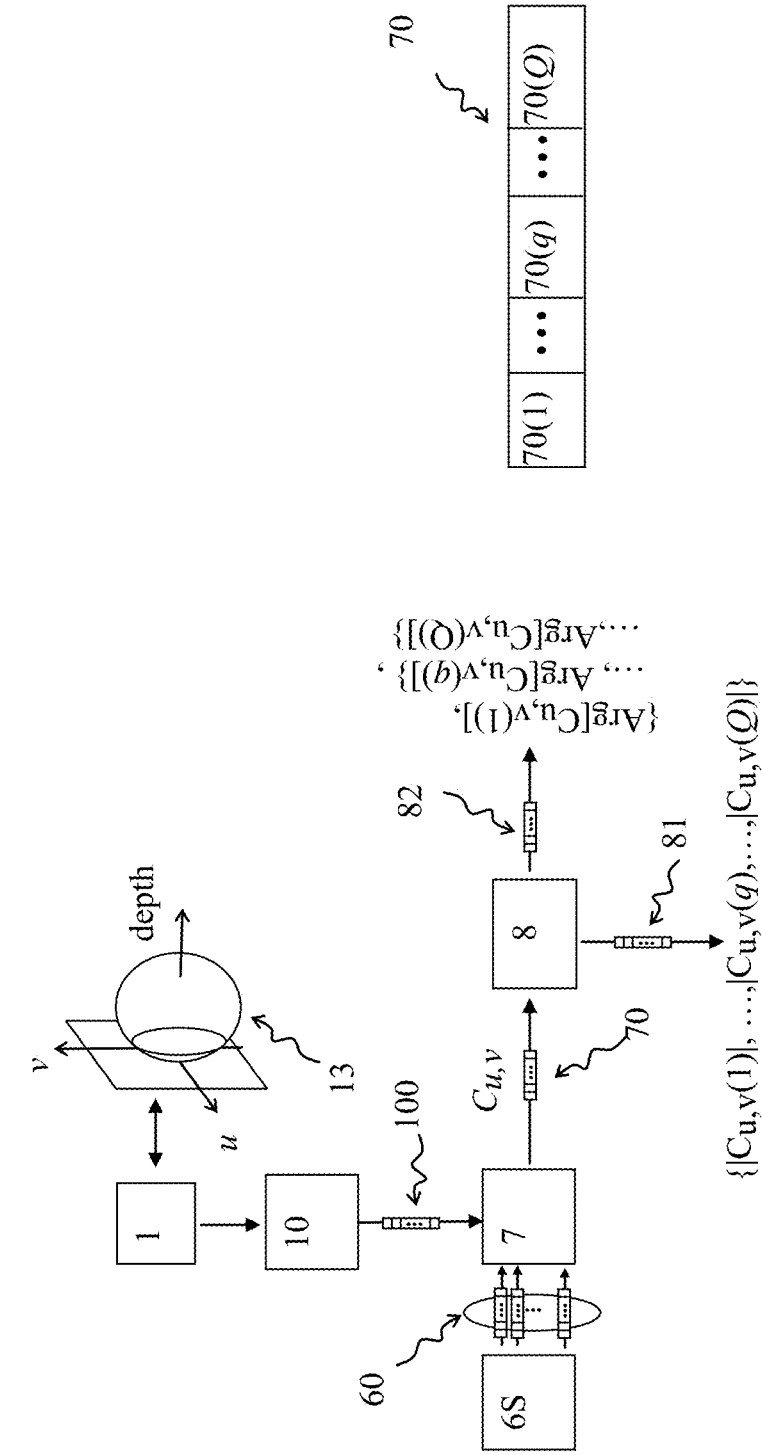
FIG. 7 shows in diagrammatic forms, a first embodiment of the invention with blocks used at the Slave stage.

A possible division of processing steps, according to the invention is shown in FIGS. 5, 6 and 7.

Master Stage.

Figure 1:
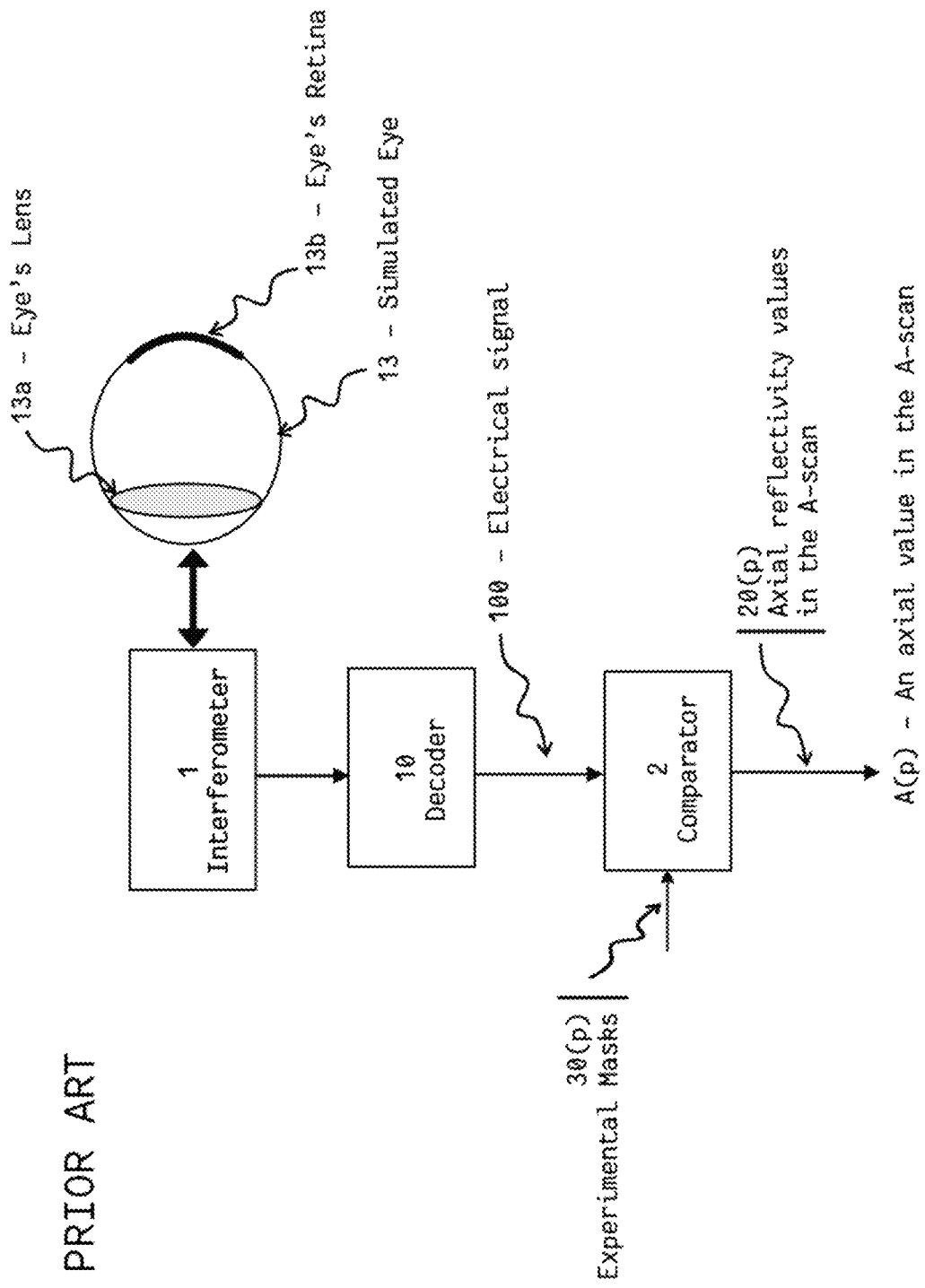
FIG. 1 shows, in diagrammatic form, the main elements of the MS interferometry (OCT) method according to prior art.
Figure 2:
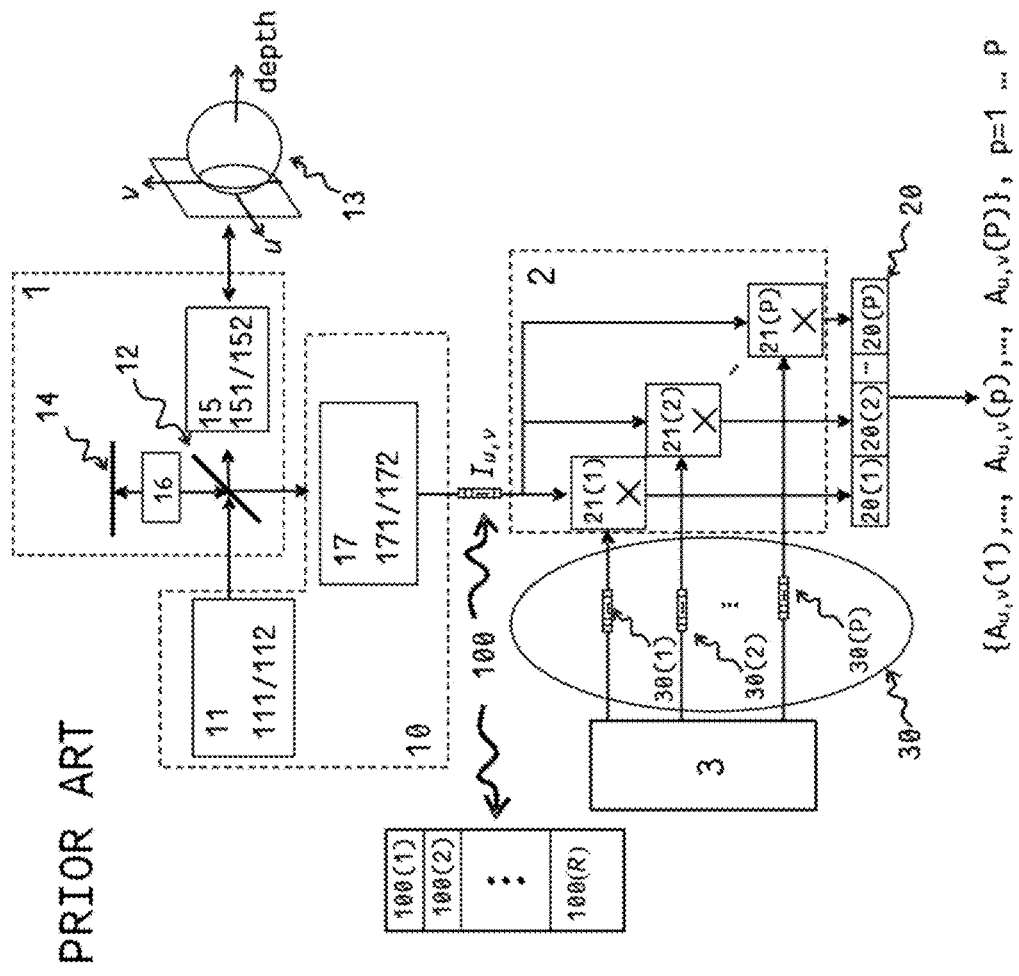
FIG. 2 shows a more detailed configuration of the prior art MS interferometry (OCT) at the Slave stage.
Figure 3:
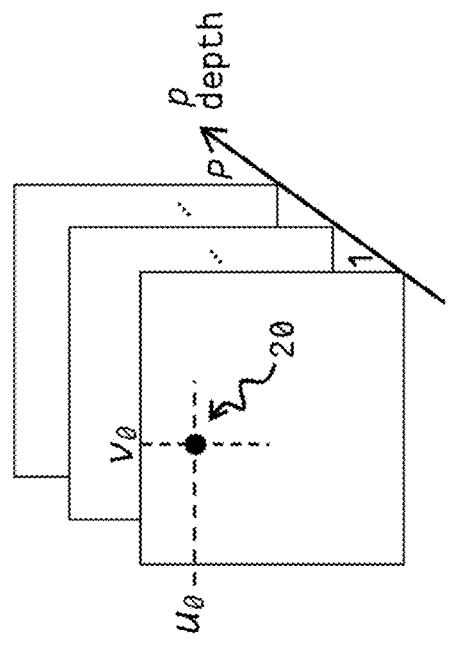
FIG. 3 shows the delivery of C-scans (en-face) OCT images along depth.
Figure 4:
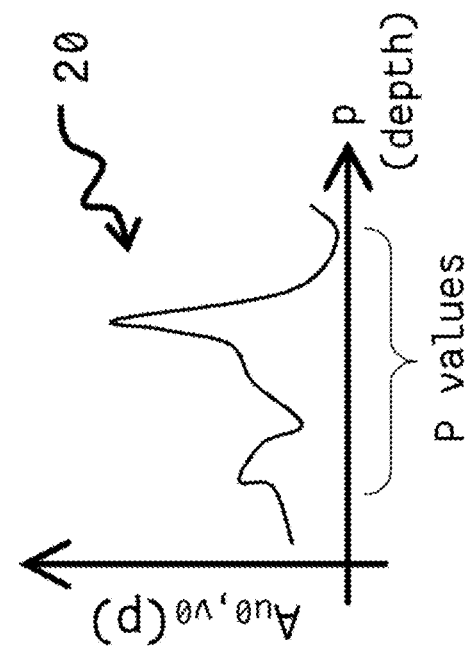
FIG. 4 shows the delivery of A-scan profiles along depth.

As shown by FIG. 5, at the Master stage, the object 13 is replaced with a model object, 13M in the interferometer 1. The model object 13M is a mirror, placed at 1, 2, . . . p, . . . P positions to determine P optical path difference (OPD) values. It should be obvious for the person skilled in the art that the same functionality is obtained by modifying the reference path length with the mirror considered as object model here fixed. Alternatively, it should also be obvious for the person skilled in the art that if the OCT configuration is to be used on eye imaging, then the model object includes a lens and the lens and the mirror are moved together (to mimic the eye shown in FIG. 1). For each OPD, an experimental channelled spectrum, proportional to the electrical signal at the decoder 10 output is acquired.

To further reduce the noise, autocorrelation terms and any extra modulations due to internal reflections in the interferometer (fibre coupler, fibre connector, and attenuator), two more recordings are done of spectra 100 with the interferometer reference arm blocked and with the interferometer object arm blocked (or no object model). Then these are deducted from all P channelled spectra acquired and the results become Master Channelled Spectra, 30($p$), with p=1, 2 . . . P, i.e. 30(1), 30(2), . . . 30(P), that are then recorded in the Master Storage, 3. In cases when there is no access to block the reference arm, only one deduction is performed, with no object in front of the interferometer. The deduction of channelled spectra before storing the results is optional. At this stage, operations are similar to that prior art MS. However, according to the invention, the storage 3 of reference signals 30 is used to store a much reduced number P of experimentally acquired Master Channelled Spectra than necessitated by the MS prior art. According to the invention and explained further below, even P=2 Master Channelled Spectra may be sufficient.

Preparation Stage.

In FIG. 6, the P-Master Channelled Spectra, 30($p$), are read from the storage 3 and input to a Phase Recovery Calculator, 4. This is used to extract the Master Phase, 40, of each Master Channelled Spectrum array, 30(1), 30(2), . . . 30(P) and advantageously, eliminate the amplitude shape of the spectrum. An embodiment of the Phase Recovery Block is detailed in FIG. 8.

A Synthesiser, 5 generates two Synthesised Arrays, G={G (1), . . . , G(r), . . . , G(R)}, 541, and H={H(1), . . . , H(r), . . . , H(R)}, 542, calculated according to the Master Phases 40 provided by the Phase Recovery Calculator 4. G corresponds to the non-linearity of translating the spectrum collected along the coordinate axis r in the decoder 10, and H to the dispersion left uncompensated in the interferometer 1.

The Synthesised Arrays G, 541, and H, 542, contain real values and are used for a set of different depths {1, . . . q, . . . , Q} required by the user, 601, in a Mask Generator, 6, to generate arrays of Synthesised Complex Masks, 60 (that will operate as reference signals to the comparison operation at the Slave stage), a mask for each depth. The number of depths, Q, and the sampling, that can be uniform or not, are chosen by the user independently from the OPD values, P, of the P Master Channelled Spectra 30($p$) acquired at the Master stage and stored in the Master Storage, 3. Each Synthesised Complex Mask, SM(q), 60($q$), for q=1 to Q, is an array of complex values SM(q)={SM(q,1), . . . , SM(q,r), . . . , SM(q,R)} and is stored in the Preparation Storage block, 6S. The Mask Generator 6 is equipped with other control inputs for the user. For example, two control inputs are illustrated but more can be used. A first control input is enabled when there is a need to compensate for the dispersion due to the object for one or several depths q in the object 13. The knowledge on dispersion of the object, is incorporated into a Dispersion Function, D, that is applied to control input 602. A second control input is used for a Window Function W, 603. This is enabled when there is a need to apply a filter in order to smooth the variation of the reflectivity according to the depth. Otherwise, block 6 can operate with the inputs 541 and 542 from Synthesiser 5 only.

Slave Stage.

The object 13 under investigation is placed in the object arm of the interferometer 1. In FIG. 7, the array of each Synthesised Complex Mask 60($q$) (as reference signals), for each depth q, is read from the Preparation Storage, 6S, and is compared with the Slave Channelled Spectrum 100 in the Reflectivity Calculator 7. This comparison leads to a complex valued reflectivity C(q), 70($q$), whose absolute value, 81($q$), and argument, 82($q$), are calculated by a Polar Form Calculator, block 8, for each depth q. The absolute value and the argument correspond respectively to the reflectance and the phase at the depth q, in the object 13. Advantageously, the phase is conserved in comparison to the MS prior art.

Figure 8:
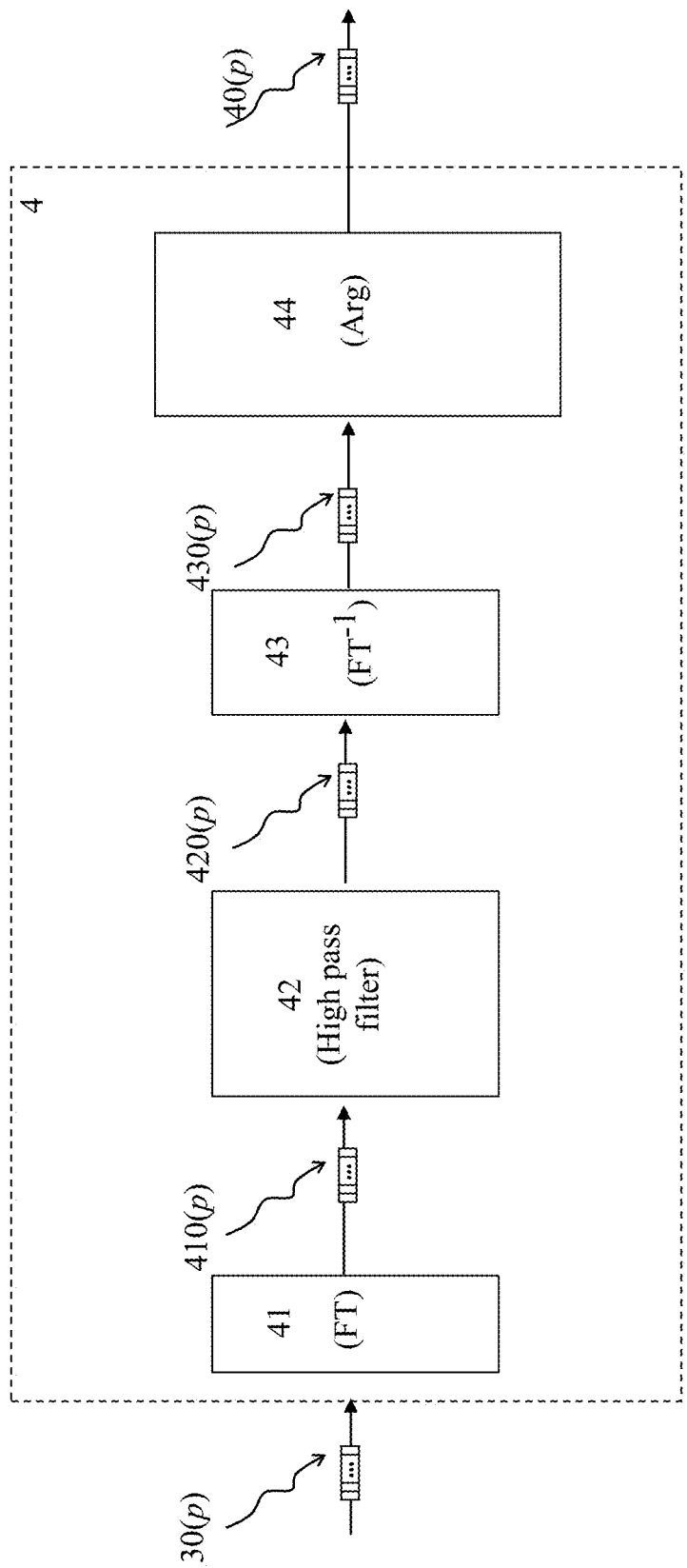
FIG. 8 shows in more details the Phase Recovery Calculator, block 4, of the first embodiment of the CMS method at Preparation stage according to the invention.

It should be understood that the first two stages in FIG. 5 and FIG. 6 can be collapsed into a single preliminary stage, or some of the operations in the $2^{nd}$ stage can be attached to the $3^{rd}$ stage in FIG. 8 and the division of operations across the FIGS. 5,6,7 presented is only for simplification of presentation of structure and operations.

The comparison operation can be performed in several ways, by cross correlation or using mixers. As a further improvement to the prior art, this operation can also be performed using matrices. To this goal, the Reflectivity Calculator, block 7, performs a Discrete Integral Transform with the Kernel Function K(q,r) as follows:

$$C_{u,v}(q) = \sum_{r=1}^{R} K(q,r) I_{u,v}(r) \quad (2)$$

with $$K(q,r) = SM(q,r) \quad (3)$$

where $C_{u,v}(q)$ is the complex reflectivity at the optical path difference q, $I_{u,v}$ is the Slave Channelled Spectrum according to the pixel (u,v) in the two lateral directions across the object. The Slave Channelled Spectrum $I_{u,v}$, 100, is digitized into R elements corresponding to the resolvable spectral components within the source spectrum, leading to $I_{u,v}$= $\{I_{u,v}(1), \ldots, I_{u,v}(r), \ldots, I_{u,v}(R)\}$, r=1, 2 ... R. The Synthesised Complex Masks SM(q)=$\{SM(q,1), \ldots, SM(q,r), \ldots, SM(q,R)\}$, 60(q), are evaluated for r=1, 2 ... R, with the element SM(q,r) defined by $$SM(q, r) = \qquad (4)$$
$$dG(r) \times F_{pin603}(r) \times \mathrm{Exp}\left[-i\left(\frac{4\pi}{c}G(r)l(q) + H(r) + F_{pin602}(G(r))\right)\right]$$

where $F_{pin602}(r)$=D(r) is the Dispersion Function applied to the input 602, $F_{pin603}(r)$=W(r) is the Window Function applied to the input 603, where the parameter l(q) corresponds to the depth l(q) in the object required by the user, 601, where G and H are the Synthesised Arrays 541 and 542, and where dG(r) is the derivative of G(r) in respect to r. Via the two control inputs, 602 and 603, the user can input a Function D(r) corresponding to the dispersion of the sample at a depth defined by the user, to the control input 602, and a window function W(r) (such as a Hamming window), to the control input 603, for apodization.

The window function W(r) can be used for apodization, in order to minimize the maximum (nearest) side lobe of the axial Point Spread Function (PSF), where PSF is the A-scan profile of a mirror as object at the Slave stage.

The embodiment in FIG. 7, complemented by the stages in FIG. 5 and FIG. 6, illustrates the novel functionality implemented in comparison with prior art (PCT patent application mentioned above). There are six main distinctive features: 1) the comparison operation at the core of the MS principle is between the Slave Channelled spectrum 100 and the Synthesised Complex Masks 60 that replace the experimental Masks (Amplitude Masks) recorded at the Master stage in the prior art MS. 2) The Synthesised Complex Mask is theoretically calculated to determine signal from a selected depth q at the Slave stage. 3) the arrays of Synthesised Complex Masks 60(q) are complex, i.e. they store phase information. Not only that the phase is restored, but advantageously, the complex form of the result leads to better stability as demonstrated in FIG. 30. 4) The spectral envelope of the optical source power spectrum is eliminated, where all components of the array 60(q) are made of equal amplitude, irrespective of the optical frequency (coordinate r). 5) The Master channelled spectra 30 stored are not directly used as masks. Also, the number Q of the Synthesised Complex Masks is independent from the number P of Master channelled spectra signals 30 recorded and stored. 6). Also, the CMS method disclosed, replaces the prior art procedure based on a discrete set of masks, with a procedure based on two Synthesised Arrays 541 and 542 that can be used to generate Complex Masks 60(q), for as many depths, Q, as desired. Additionally, the Synthesised Complex Masks, 60, can be adapted to include external parameters.

In FIG. 8, an embodiment is presented, for the Phase Recovery Calculator, block 4. Let M(p)=$\{M(p,1), \ldots, M(p,r), \ldots, M(p,R)\}$ be the array of the p-Master Channelled Spectrum 30(p), acquired at the Master stage from the Model object 13M for p=1 to P, stored in the Master Block, 3. The main task of the Phase Recovery Calculator 4 is to eliminate the spectral variation of strength of the Synthesised Complex Masks, due to the power spectrum shape of the optical source, i.e. to retain the modulation term only, of the experimentally acquired channelled spectra at the Master stage. A Fourier Transform (FT) block 41, produces the FT, 410(p), for each Master Channelled Spectrum 30(p). A high pass filter (HPF) 42 removes the DC component of 30(p) and additionally is used to select half of the spectral range of the Fourier domain for positive or negative frequency values. By multiplying 410(p) with the HPF, 42, and calculating the inverse FT of the product in block 43 ($FT^{-1}$), a complex exponential form $\underline{M}(p)$=$\{\underline{M}(p,1), \ldots, \underline{M}(p,r), \ldots, \underline{M}(p,R)\}$, 430(p), is obtained, that represents a complex form of the p-Master channelled spectrum M(p). The amplitudes of 430(p) are equal to 1 along the coordinate axis r, i.e. there is no modulation due to the power spectrum shape, and this is obtained in block 4, according to the invention, without division (as done in the prior art, as mentioned in the Optics Express 23, 14148-14161 (2015) paper above). An Argument (Arg) block 44 calculates the argument of the complex form of the p-Master channelled spectrum, 430(p), and delivers the Master Phase $\varphi(p)$=$\{\varphi(p,1), \ldots, \varphi(p,r), \ldots, \varphi(p,R)\}$, 40(p), according to:

$$\varphi(p,r)=\mathrm{Arg}[\underline{M}(p,r)]. \qquad (5)$$

Figure 9:
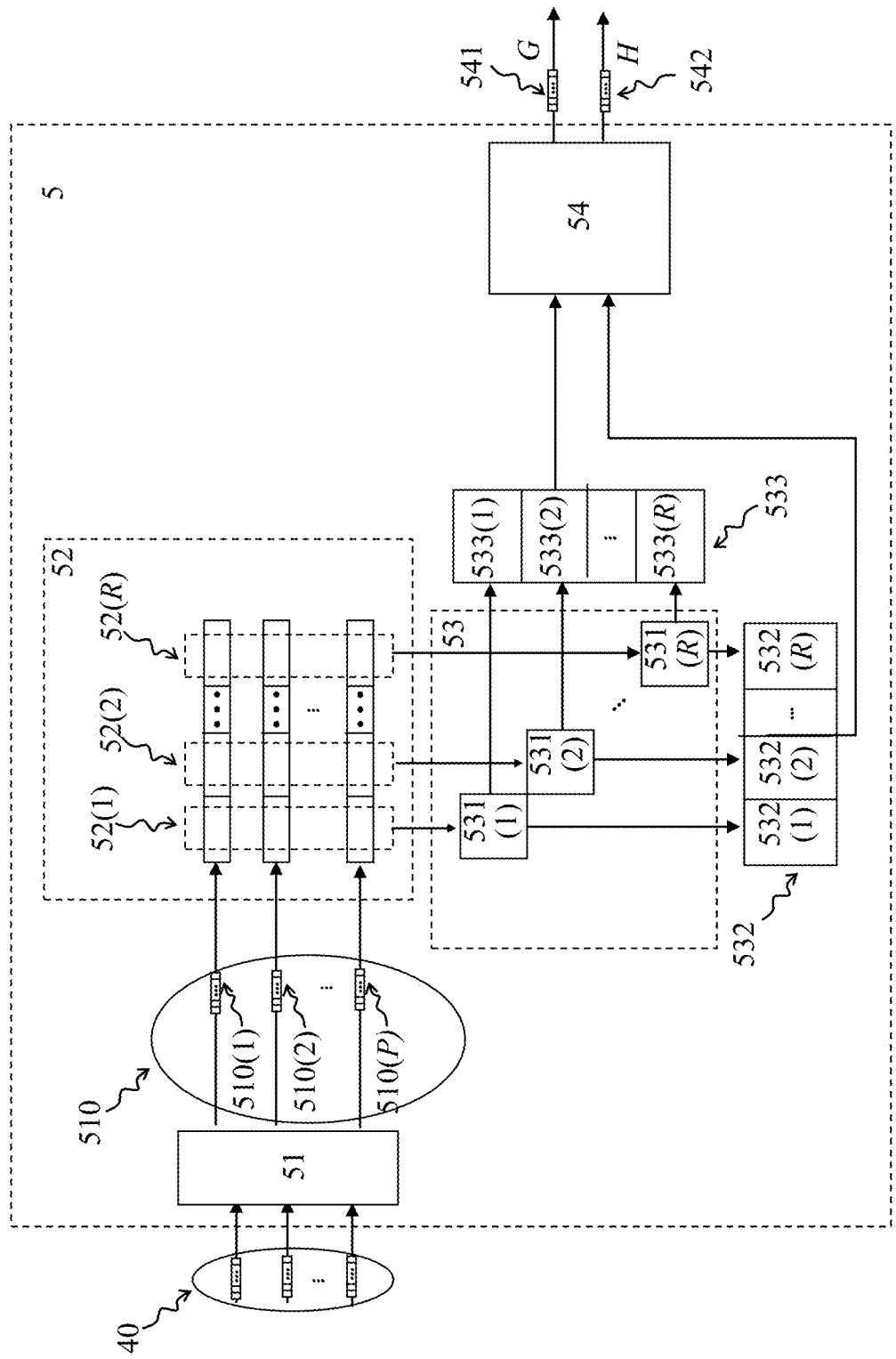
FIG. 9 shows in more details a first embodiment of the Synthesiser, 5, according to the invention.

FIG. 9 discloses in diagrammatic form an embodiment of the Synthesiser, 5, according to the invention. The purpose of this block is to generate the two Synthesised Arrays G, 541, and H, 542, from the array of Master Phases, 40.

The Synthesiser contains four blocks, 51, 52, 53 and 54, that are detailed below.

The Phase Derivative, Block 51:

This block is used to calculate the derivative 510(p) of the Master Phases, 40(p), with respect to the coordinate axis r, in order to eliminate the instabilities of the phase (random phase) from P Master Channelled Spectra 30(p) acquired at the Master stage.

Indeed, for a model object 13M in the slave interferometer, the Master Phase 40(p) $\varphi(p)$=$\{\varphi(p,1), \ldots, \varphi(p,r), \ldots, \varphi(p,R)\}$ can be written according to:

$$\varphi(p, r) = \frac{2\pi}{c}G(r)OPD(p) + H(r) + \phi^{random}(p) \qquad (6)$$

where c is the speed of light, G and H are the Synthesised Arrays 541 and 542, OPD(p) is the optical path difference associated to the p-Master Channelled Spectrum, 30(p), and $\Phi_{(p)}^{random}$ is the random phase that corresponds to a random phase shift associated to 30(p). By calculating the derivative of the Master Phases with respect to r, the block 51 outputs the derivative 510(p), $d\varphi(p)$=$\{\varphi(p,1), \ldots, d\varphi(p,r), \ldots, d\varphi(p,R)\}$ with $$d\varphi(p, r) = \frac{2\pi}{c}dG(r)OPD(p) + dH(r) \qquad (7)$$

where $d\varphi(p,r)$, dG(r) and dH(r) are the derivatives of $d\varphi(p,r)$, G(r) and H(r) in respect to r respectively.

The r-Component Selector, Block 52:

The derivatives $d\varphi(p)$=$\{d\varphi(p,1), \ldots, d\varphi(p,r), \ldots, d\varphi(p,R)\}$, 510(p), for p=1 to P, are organised in R-new arrays, 52(r) for r=1 to R, where R is the number of pixels in the line camera in the spectrometer, when using spectrometer (Sp) based interferometry or Sp-OCT, or the number of temporal slots, defined as the ratio of tuning bandwidth to the dynamic linewidth, when using swept source (SS) interferometry or SS-OCT. The new array $52(r)$ $d\varphi^T(r)$ can be expressed according to the evolution of p for a fixed r and is equal to:

$$d\varphi^T(r) = \{d\varphi(1,r), \ldots, d\varphi(p,r), \ldots, d\varphi(P,r)\} \quad (8)$$

The System Performance Recovery, Block 53:

This is made of R blocks $531(r)$, each performing fitting along each of the array $52(r)$. The interferometer 1 is completely described by the two Synthesised Arrays, G and H. In order to retrieve G and H, a linear fit, in each block $531(r)$, according to OPD(p), is carried out on each r-array $52(r)$, for r=1 to R. Indeed, according to Eq. (7), the array $52(r)$ $d\varphi^T(r)$ can be written in the form of a linear equation y=a OPD(p)+b, versus OPD(p). The slope, a, corresponding to $2\pi dG(r)/c$, 533, and the y-intercept, b, corresponding to dH(r), 532, are the slope and the intercept respectively of fitting the $d\varphi^T(r)$ data with such a linear approximation.

The Integrator, Block 54:

The functions $2\pi dG(r)/c$ 533, and dH(r) 532, are integrated along r and the constants of integration are chosen in order that G, 541, and H, 542, are equal to zero at the centre of the range $\{1, \ldots, R\}$. The functions G and H consist in two arrays of R-elements, $G=\{G(1), G(2), \ldots, G(R)\}$, 541, and $H=\{H(1), H(2), \ldots, H(R)\}$, 542.

Figure 10:
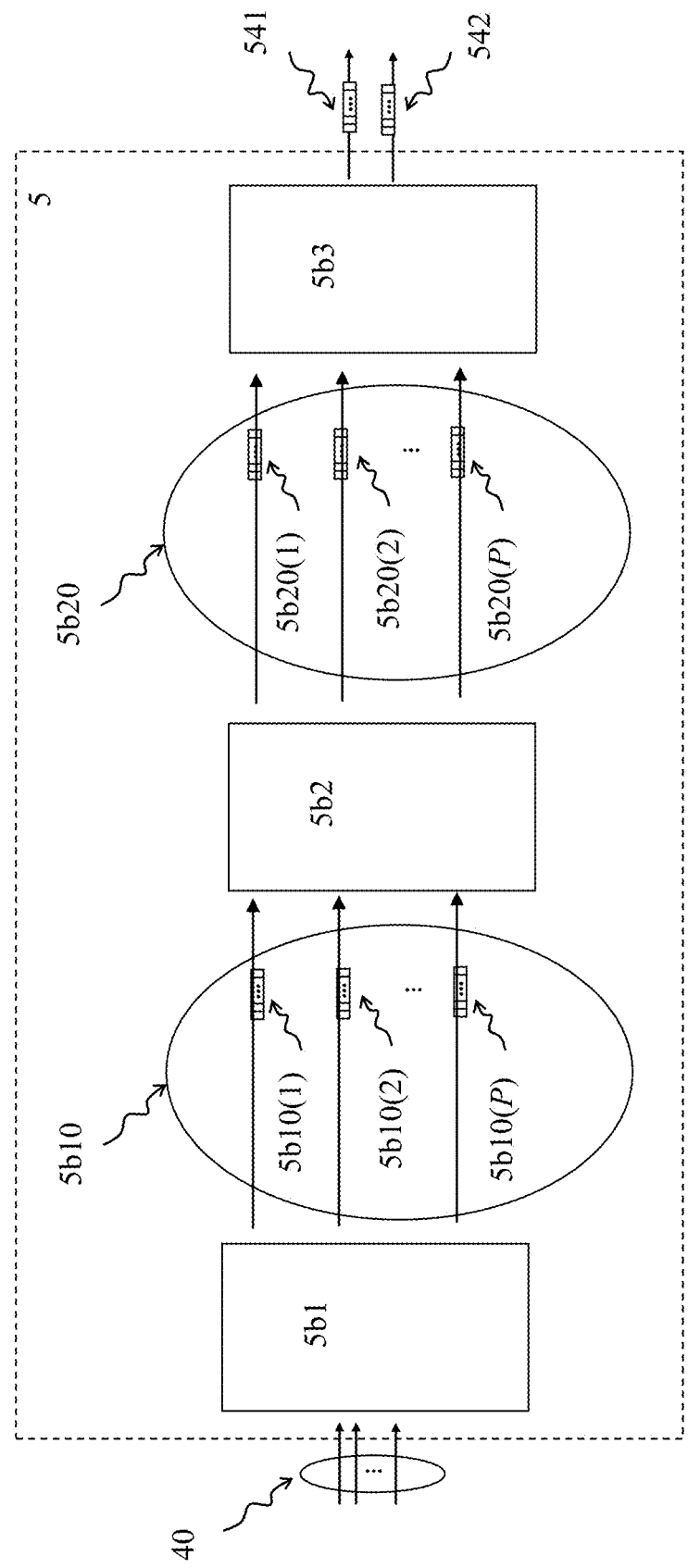
FIG. 10 shows in diagrammatic form, a second embodiment of the Synthesiser, 5, according to the invention.

FIG. 10 discloses in a diagrammatic form another embodiment for the Synthesiser, 5. It consists in three blocks:

1) an Unwrapping Block, 5b1, that unwraps the P-Master Phases 40. Its output is represented by an Unwrapped Master Phase $\varphi^U(p)$, $5b10(p)$, corresponding to each p-Master Phase $40(p)$. The Unwrapped Master Phase $\varphi^U(p)$ consists in an array of R-elements $\varphi^U(p) = \{\varphi^U(p,1), \ldots, \varphi^U(p,r), \ldots, \varphi^U(p,R)\}$.

2) A Random Phase Cleaner, 5b2, that subtracts a value of the Unwrapped Master Phase for a chosen pixel $r_0$ in the spectral domain from each Unwrapped Master Phase. The pixel $r_0$ can be chosen at the centre of the spectral range. The phase difference called Clean Unwrapped Phase, $5b20(p)$, gives an array $\varphi^U(p) - \varphi^U(p,r_0) = \{\varphi^U(p,1) - \varphi^U(p,r_0), \ldots, \varphi^U(p,r) - \varphi^U(p,r_0), \ldots, \varphi^U(p,R) - \varphi^U(p,r_0)\}$, where the elements of this array are equal to $$\varphi^U(p,r) - \varphi^U(p,r_0) = \frac{2\pi}{c} G(r) OPD(p) + H(r) \quad (9)$$

with $G(r_0)=0$ and $H(r_0)=0$. As shown by (9), the Clean Unwrapped Phase is not sensitive to the random phase $\Phi_{(p)}^{random}$.

3) A Fit Calculator, 5b3, calculates the slope, i.e. a quantity proportional to G(r), 541 and the y-intercept, i.e. H(r), 542, of the linear equation according to OPD(p) described by (9).

Figure 11:
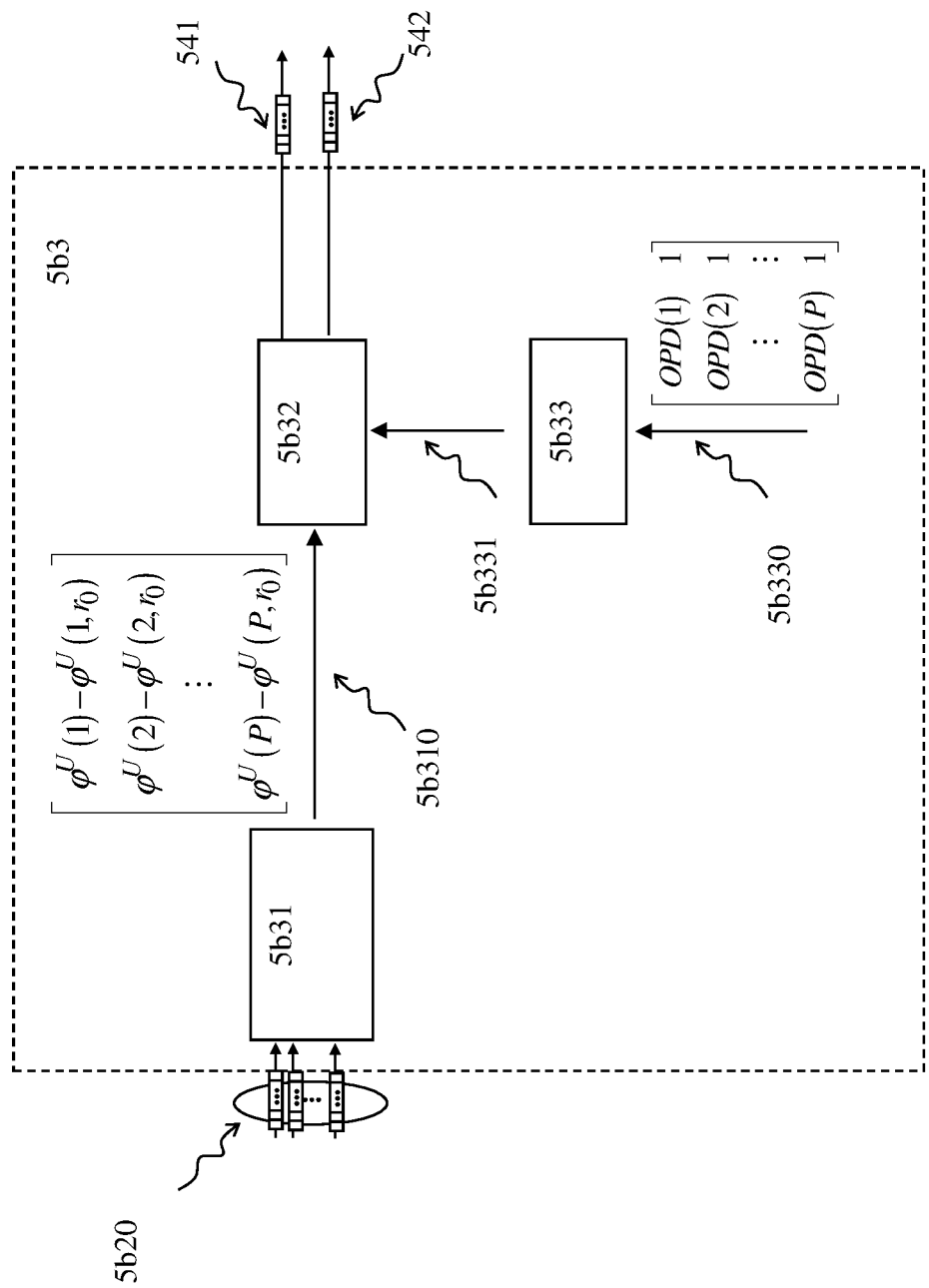
FIG. 11 shows in more details the Fit Calculator, block 5b3, of the second embodiment of the Synthesiser according to the invention.

FIG. 11 discloses in a diagrammatic form the calculation of the linear fit done by the Fit Calculator 5b3. To explain its operation, first we can write the relationship between the Clean Unwrapped Phase and the OPD in matrix form as follows $$\begin{bmatrix} \varphi^U(1) - \varphi^U(1,r_0) \\ \vdots \\ \varphi^U(P) - \varphi^U(P,r_0) \end{bmatrix} = \begin{bmatrix} OPD(1) & 1 \\ \vdots & \vdots \\ OPD(P) & 1 \end{bmatrix} \begin{bmatrix} \frac{2\pi}{c} G \\ H \end{bmatrix} \quad (10)$$

where the vector $$\begin{bmatrix} \varphi^U(1) - \varphi^U(1,r_0) \\ \vdots \\ \varphi^U(P) - \varphi^U(P,r_0) \end{bmatrix}$$

is called Phase Vector, 5b310, and the matrix $$\begin{bmatrix} OPD(1) & 1 \\ \vdots & \vdots \\ OPD(P) & 1 \end{bmatrix}$$

OPD matrix, 5b330.

By calculating the product between the pseudoinverse of OPD Matrix, 5b331, and the Phase Vector, 5b310, it is possible to retrieve G and H as follows:

$$\begin{bmatrix} \frac{2\pi}{c} G \\ H \end{bmatrix} = \begin{bmatrix} OPD(1) & 1 \\ \vdots & \vdots \\ OPD(P) & 1 \end{bmatrix}^+ \cdot \begin{bmatrix} \varphi^U(1) - \varphi^U(1,r_0) \\ \vdots \\ \varphi^U(P) - \varphi^U(P,r_0) \end{bmatrix} \quad (11)$$

with $$\begin{bmatrix} OPD(1) & 1 \\ \vdots & \vdots \\ OPD(P) & 1 \end{bmatrix}^+$$

being the pseudoinverse of the OPD Matrix, 5b330.

From the P-Clean Unwrapped Phase arrays, 5b20, the Vector Organiser, block 5b31, creates the Phase Vector, 5b310. The Matrix Inversion Block, block 5b33, works out the pseudo-inverse of the non-square OPD Matrix, dimension (2,P) and the Matrix-Vector Product, block 5b32, calculates the product between the pseudoinverse of the OPD Matrix, 5b331 and the Phase Vector, 5b310.

Figure 12:
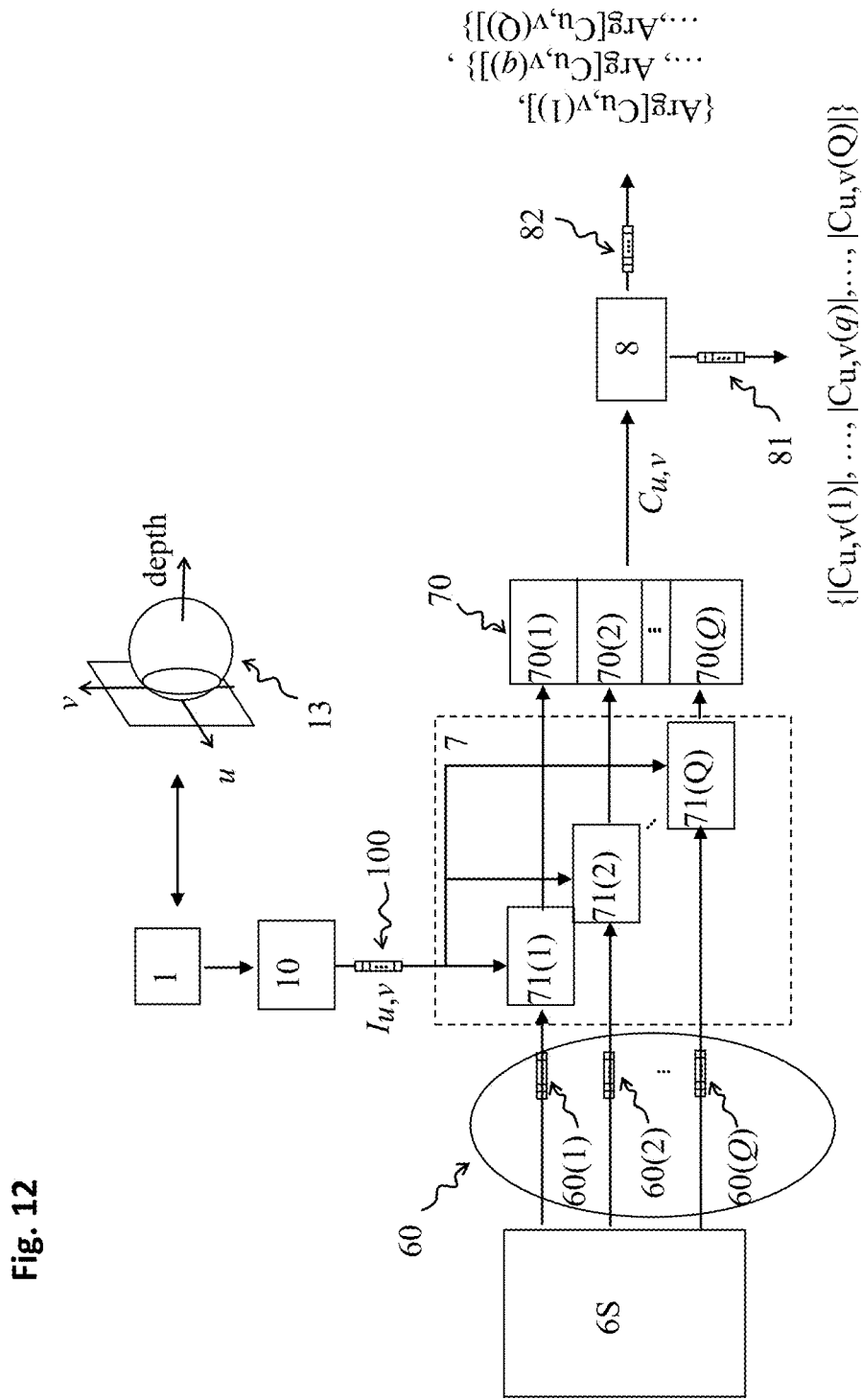
FIG. 12 show in diagrammatic form, an embodiment of the CMS interferometry (OCT) method at the Slave stage according to the invention.

FIG. 12 shows, a more detailed embodiment of the CMS method at the Slave stage according to the invention. Here, the Slave Channelled Spectrum $I_{u,v}$, 100, is an array of real values $\{I_{u,v}(1), \ldots, I_{u,v}(r), \ldots, I_{u,v}(R)\}$, where r=1 to R is an element of the coordinate axis associated to the output signal of the slave measuring interferometer: a non-uniform distribution of optical frequency (wavenumber) along the pixel line of the spectrometer (171) for a broadband source (111) or along the acquisition time of the photodetector (172) for a swept source (112). $I_{u,v}$ is measured according to the pixel (u,v) in the two lateral directions across the object, determined by the transversal scanners 151 and 152.

For an A-scan measurement (no transversal scanners 151 and 152, such as for sensing applications), the Slave Signal $I_{u0,v0}$ is analysed for a single lateral pixel $(u_0,v_0)$. Q-Synthesised Complex Masks, $60(q)$, are delivered by the Preparation Storage 6S. For q=1 to Q, the Reflectivity Calculator, 7, performs a discrete integral transform on $I_{u0,v0}$ with the Kernel function K(q,r) equal to the Synthesised Complex Mask SM(q,r). For each needed depth q, block 7 is equipped with an elementary Reflectivity Calculator Block, 71(1) to 71(Q). The result of the Q-discrete integral transforms is an array of complex values $\{C_{u0,v0}(1), \ldots, C_{u0,v0}(q), \ldots, C_{u0,v0}(Q)\}$, 70. The Polar Form Calculator, block 8, calculates their polar forms.

In OCT, the procedure is repeated for each (u,v) pixel to generate a Slave Signal $I_{u,v}$, (100). The arrays of signals 70 obtained for all (u,v) pixels represent the object volume.

Alternatively, the user can obtain a single C-scan (en-face) OCT image. In practice however, Q is larger than 100. The user inputs a value of depth, q, to the input 601 of the Synthesiser, 5, in order to select the depth of the C-scan OCT image in the object 13 and determine the amplitude 81 and the phase 82 at the required depth, q. The Reflectivity Calculator is performed for all the positions (u,v), and the Polar Form Calculator, 8, gives the reflectance map and the phase map for all particular depths chosen, Q. Moduli and phases can be mapped versus transversal coordinates (u,v) leading to en-face (C-scan) OCT images as shown in FIG. 13 and en-face (C-scan) display of phases as shown in 14

FIG. 13 shows the delivery of C-scans (en-face) OCT images proportional with the modulus of the interference signal along depth, of the embodiment in FIG. 12.

FIG. 14 shows the delivery of phase maps in the form of C-scans (en-face) OCT images along depth, of the embodiment in FIG. 12.

For A-scans, the Polar Form calculator, 8, delivers the amplitude value, i.e. the reflectance profile, 81, and the argument, i.e. the phase profile, 82 of the object along the A-scan at the transversal position (u0,v0), as shown respectively in FIGS. 15 and 16.

FIG. 15 shows the delivery of A-scan profile, proportional to the modulus of the interference signal, along depth, of the embodiment in FIG. 12.

FIG. 16 shows the delivery of A-scan profiles of the phase of the interference signal, along depth, of the embodiment in FIG. 12.

FIG. 17 discloses in a diagrammatic form the Reflectivity Calculator, block 7, implemented using matrix calculations. A Matrix Organiser, 72, writes the Synthesised Complex Masks, 60, in a matrix form, called Reference Matrix, 720. This has Q lines and R columns. Each line of this matrix is a Complex Mask at a given depth, 1, 2, . . . Q. A Conditioning Block, 73, writes the Slave Channelled Spectra, 100, in a matrix 730, for each (u,v) pixel (C-scan), for a fixed position, v. Let us consider that u represents the horizontal position and v the vertical position of the pixel in the transversal section of the object, in a raster of V lines, where each line has U pixels. The columns of matrix 730 represent Slave Channelled Spectra acquired at each u value along the line v. The matrix 730 has U columns (as many as pixels along the coordinate u) and R lines. The result of multiplying the two matrices leads to a matrix of (Q,U) dimension. This represents T-scans in the object along vertical position in the object 13 determined by v, for all depths Q. The same product is repeated for the next line at a vertical pixel v from 1 to V.

FIG. 18 discloses in a diagrammatic form the Reflectivity Calculator, 7, in the previous embodiment, where the invention is used for an A-scan measurement only (metrology, sensing applications). In this case, the Conditioning Block, 73, writes the Slave Channelled Spectra, 100, in a vector form for the signal acquired from transversal pixel (u0,v0) of the object 13 (as determined by the transversal scanners, 151, 152 ). Matrix 730 reduces to a single column of R lines.

5.1. Demonstration of Eq. (8)

The theoretical elements developed below are given with continuous signals, with a non-dispersive multilayer sample (D=0) and without the Window W (W=1).

The Complex Master Slave operator is defined by the following Transform integral of the Slave Channelled Spectrum 100, $I_{u,v}$ (the channelled spectrum according to the pixel (u,v) in the two lateral directions across the object) with the Kernel Function $K(\tilde{v},l)$, equal to the where l signifies depth:

$$CMS(l) = \int_{-\infty}^{+\infty} K(l, \tilde{v}) I_{u,v}(\tilde{v}) d\tilde{v} \quad (12)$$

The decoder block 10 translates the channeled spectrum shape at the interferometer output into an electrical signal $I_{u,v}$, 100, according to the lateral pixel (u,v) in the object 13. The signal 100 is a superposition of modulations described by a DC term corresponding to the envelope of the source spectrum, $I_{DC}$, and a complex exponential form of a periodic function. In practice signal 100 is not digitized over a coordinate proportional to the optical frequency, v, but along the non-uniform variable coordinate $\tilde{v}$ (index r used in this disclosure) associated to the pixel line of the spectrometer (171) for a broadband source (111) or along the acquisition time of the photodetector (172) for a swept source (112). The function $G(\tilde{v})=v$, array 541 in the disclosure, incorporates this non-linearity, and $I_{DC}(v)$ has to be written versus $\tilde{v}$, i.e. $I_{DC}(v)=I_{DC}(G(\tilde{v}))$.

The channelled spectrum $I_{u,v}$ affected by the non-uniform variable coordinate can be written versus $\tilde{v}$ as follows:

$$I_{u,v}(\tilde{v}) = I_{DC}(G(\tilde{v})) + \frac{1}{2}(\underline{I}_{u,v}(\tilde{v}) + \underline{I}^*_{u,v}(\tilde{v})), \quad (13)$$

where the underline denotes the complex expression of a real function * corresponds to its complex conjugate and $I_{DC}(G(\tilde{v}))$ is the envelope of the source spectrum (no interference modulation).

A skilled person in interferometry and optical coherence tomography knows that signal 100 depends on the phase difference between the reference arm and object arm.

In the simplest case, such spectrum is Amplitude exp (iPhase), where the Phase is the product of OPD and wavenumber. However, due to the nonlinearity of the source (112) (or the detector (171)) and the unbalanced dispersion of the interferometer, this phase depends on G, array 541 (like a wavenumber) in the disclosure, and H, array 542 (an extra term to the product of OPD and wavenumber), as described in Eq. (6). So, the terms in the bracket after i in the exponent in Eq. (14) are all already listed in the Eq. (6).

For an object 13 with several interfaces characterized by a complex reflectivity 70, each interface contributes to each spectral pixel $\tilde{v}$ of the signal 100 in the form of continuous summation over the spatial axial coordinate z. The symbol $\tilde{v}$ corresponds to the pixels of the line array detector, or along time when using a tunable laser. In Eq. (6), a random phase is added to take into account a random phase shift associated to the individual measurement of the p-Master Channelled Spectrum, 30(p). For the signal 100, the random phase is identical for all the contributions of the interfaces since the interferometer is considered to be stable during the measurement of the signal 100.

To put it simpler, Eq. (14) is the elementary operation of any OCT system. All terms used have been defined in the disclosure above this equation.

When $I_{u,v}$ is described versus $\tilde{v}$, $I_{u,v}$ presents a modulation chirp instead of a strictly periodic modulation. A skilled person in interferometry and optical coherence tomography knows that the electrical signal can be modeled by a continuous summation of modulations as follows:

$$\underline{I}_{uv}(\tilde{v}) = \int C(z) A(G(\tilde{v})) \text{Exp}\left[i\left(\frac{2\pi}{c} G(\tilde{v}) 2z + H(\tilde{v})\right)\right] dz \quad (14)$$

whose phase $$\varphi(\tilde{v}, z) = \frac{2\pi}{c} G(\tilde{v}) 2z + H(\tilde{v})$$

is non linear according to $\tilde{v}$. The depth z=0 corresponds to the optical path difference equal to 0 in the interferometer. A(v) represents the interference contrast. In practice, A(v) is different from the power spectrum of the optical source, $I_{DC}(v)$, hence the notation used in (14).

The Kernel Function $K(l,\tilde{v})$ can be expressed according to the continuous element of the Synthesised Complex Masks SM $(l,\tilde{v})$ where $$K(l, \tilde{v}) = SM(l, \tilde{v}) - dG(\tilde{v}) \times \text{Exp}\left[-i\left(\frac{4\pi}{c} G(\tilde{v}) l + H(\tilde{v})\right)\right] \quad (15)$$

For l>0, CMS(l) is equal to:

$$CMS(l) = \frac{1}{2} \int_{-\infty}^{+\infty} K(l, \tilde{v}) I_{u,v}(\tilde{v}) d\tilde{v} \quad (16)$$

where the channeled spectrum in (16) is now complex in comparison with (12). By using the expression of K in Eq. (15) and $\underline{I}_{u,v}$ in Eq. (14), CMS operation can be written as:

$$CMS(l) = \frac{1}{2} \int \int C(z) \times A(G(\tilde{v})) \times \quad (17)$$

$$\text{Exp}\left[-i\left(\frac{2\pi}{c} G(\tilde{v}) \times 2(l-z)\right)\right] \times \frac{dG}{d\tilde{v}}(\tilde{v}) d\tilde{v} \, dz,$$

which can be simplified by the changes of variable v=G($\tilde{v}$) and δ=l−z as follows:

$$CMS(l) = \frac{1}{2} \int \int C(l-\delta) A(v) \text{Exp}\left[-i\frac{2\pi}{c} v 2\delta\right] dv \, d\delta. \quad (18)$$

which leads to $$CMS(l) = \frac{1}{2} C(l) \otimes P_0(2l/c) \quad (19)$$

where $\otimes$ is the convolution product and $P_0$ is the axial Point Spread Function (PSF) defined by $$P_0(t) = FT^{-1}[A(v)] \quad (20)$$

For a Dispersion Function D required by the user to compensate for the dispersion of the object at a required depth, Eq. (15) becomes $$K(l, \tilde{v}) = SM(l, \tilde{v}) - dG(\tilde{v}) \times \text{Exp}\left[-i\left(\frac{4\pi}{c} G(\tilde{v}) l + H(\tilde{v}) + D(G(\tilde{v}))\right)\right] \quad (21)$$

5.2. Using the Fourier Transform of the Slave Signal

The signal supplied by new commercial assemblies, such as digital cards, can be the FT signal of the slave channelled spectrum 100 only. There are already commercial spectrometers that do not provide output of the signal from the spectrometers, but only of the FT of the spectrometer signal. There are already swept source assemblies with photodetectors that do not provide output of the signal from the photodetector, but only of the FT of the photodetector, such as that from Axsun, USA.

FIGS. 19, 20 and 21 show in diagrammatic form, other embodiments of the CMS interferometry (OCT) method at the Master stage, at the Preparation stage and at the Slave stage, respectively, according to the invention. These embodiments disclose an apparatus and methods that rely on the FT signal of the Slave Channelled Spectrum, 10, by a Fourier Calculator 10'.

As shown in FIG. 19, at the Master stage, the Master Channelled Spectra, 30(p), are each Fourier Transformed by the FT block 10', to produce 30'(p), and stored in the Master Storage 3 (FIG. 19) as 30.

FIG. 20 shows in diagrammatic form, blocks of the invention at the Preparation stage. compatible with the signal delivered by the decoder 10 being subject to a Fourier transform. This is similar to the embodiment in FIG. 6, where a different embodiment of the Phase recovery Calculator, 4, is used as 4' and a different embodiment of the Master generator, 6, is used, as 6'.

FIG. 21 shows in diagrammatic forms, blocks of the invention at the Slave stage. compatible with the embodiments in FIG. 19 and FIG. 20. The only difference from the embodiment in FIG. 7 is the FT performed in 10' and the use of Masks 60' instead of 60.

In FIG. 21, at the Slave stage, a Fourier Calculator, 10', applies a Fourier transform to the electrical signal proportional to the Slave Channelled spectrum Signal, 100. The Reflectivity Calculator, 7, calculates the Discrete Integral Transform of FT[$I_{u,v}$], 100', with the discreet Kernel Function FT[K(q,r)*]*=FT[SM(q,r)*]* as follows $$C_{u,v}(q) = \sum_{r=1}^{R} FT[K(q,r)^*]^* FT[I_{u,v}(r)] \quad (22)$$

that is equivalent to the Plancherel-Parseval theorem applied to Eq. (2) as shown in section 5.3 for continuous notation. The FT used in the section 5.2 are applied on the domain r.

FIG. 22 details the Phase Recovery Calculator, 4', employed by the CMS interferometry (OCT) method in FIG. 20, according to the invention, when using the Fourier Transform of the Slave signal 100. Prior to measurements and part of the Preparation stage, the Master Phase Recovery, 4', calculates the inverse Fourier Transform (FT$^{-1}$), block 41', on the Master Channelled Spectra, 30, and measures the Master Phase, 40 ).

FIG. 23 details the Mask Generator 6', employed by the CMS interferometry (OCT) method in FIG. 20 according to the invention, when using the Fourier Transform of the Slave signal. The Mask Generator, 6', generates the Synthesised Complex Masks, 60', from the Synthesised Arrays G, 541, and H, 542, after being modified by three blocks: the Conjugate Calculator (Conj), 61', that calculates the conjugate of the Synthesised Complex Masks, the Fourier Calculator (FT), 62', that applies a Fourier transform to signal 610', and the Conjugate Calculator (Conj), 63', that calculates the complex conjugate of signal 620'. As shown by the embodiment in FIG. 20, the Synthesised Complex Masks, 60', are stored in the Preparation Storage Block, 6S.

5.3 Variations in the Operation of the Reflectivity Calculator 7

There are different ways disclosed here to calculate the complex reflectivity, 70, from the two continuous signals, the continuous Slave Channelled Spectrum, 100, and the continuous Kernel Function $K(l,\tilde{v})$. The calculation of the complex reflectivity $C_{u,v}(l)$ at the depth l is carried out with the integral transform for continuous functions as follows $$C_{u,v}(l) = \int_{-\infty}^{+\infty} K(l, \tilde{v}) I_{u,v}(\tilde{v}) d\tilde{v} \quad (23)$$

where $I_{u,v}(\tilde{v})$ is the continuous slave signal 100 according to the pixel (u,v) in the two lateral directions across the object and the axis r of the output signal of the slave measuring interferometer, and $K(l,\tilde{v})$ is the Kernel function defined according to the continuous Synthesised Complex Masks $SM(l,\tilde{v})$ for a depth equal to l.

1. Eq. (23) can be written according to a Fourier Transform linking domain $\tilde{v}$ to the Fourier pair codomain $2\tilde{l}/c$ where c is the speed of light, as follows:

$$C_{u,v}(l) = FT[K(l,\tilde{v})I_{u,v}(\tilde{v})]_{\tilde{v}=0} \quad (24)$$

2. According to the Plancherel-Parseval theorem, Eq. (23) can be written as follows $$C_{u,v}(l) = \int_{-\infty}^{+\infty} FT[K(l, \tilde{v})] \, FT[I_{u,v}(\tilde{v})]^* d\tilde{v} \quad (25)$$

or $$C_{u,v}(l) = \int_{-\infty}^{+\infty} FT[K(l, \tilde{v})^*]^* \, FT[I_{u,v}(\tilde{v})] d\tilde{v} \quad (26)$$

Eq. (25) describes the output signal 70 in the embodiment in FIG. 21.

3. Eq. (23) can be written as follows:

$$C_{u,v}(l) = FT^{-1}[FT[K(l,\tilde{v})^*]^* FT[I_{u,v}(\tilde{v})]]_{\tilde{v}=0} \quad (27)$$

4. Alternatively, Eq. (23) can also be written as follows:

$$C_{u,v}(l) = FT^{-1}[FT[K(l,\tilde{v})]FT[I_{u,v}(\tilde{v})]^*]_{\tilde{v}=0} \quad (28)$$

When implemented digitally for a depth l equal to l(q), FT becomes a Discrete Fourier Transform in Eq. (24), Eq. (25), Eq. (26), Eq. (27), and Eq. (28), the Slave Channelled Spectrum becomes an array of R-elements $I_{u,v} = \{I_{u,v}(1), \ldots, I_{u,v}(r), \ldots, I_{u,v}(R)\}$.

5.4. Complex Master Slave Interferometry with a Closed Loop for Compensation of Unknown Dispersion in the Object FIG. 24 discloses a schematic diagram of an embodiment to compensate the unknown dispersion due to the object, 13, at the Slave stage. When the object is made from several layers of different optical properties, it may be difficult to input accurate theoretical values to control input 602 to correct for dispersion. Therefore, an iterative procedure is disclosed, that can operate directly on the object. The embodiment consists in a closed loop between the embodiment of FIG. 6 corresponding to the Preparation stage and the embodiment of FIG. 7 corresponding to the Slave stage.

If only dispersion is to be corrected at a depth q defined by the user, 91, a Corrector, block 9, feeds input into pin 602 to apply a Dispersion Function D(r) in order to achieve a maximum A-scan peak at the depth q.

For an apparatus where there is no access to the slave channelled spectrum acquired from the object 13, signal 100, but only to its FT signal, 100', a closed loop is used between the embodiments disclosed in FIGS. 20 and 21.

5.5. Complex Master Slave Interferometry with Iterative Generation of G and H

FIG. 25 in a schematic diagram discloses an embodiment to determine the arrays G, 541, and H, 542, from a model object 13M' that has several interfaces along the range targeted at the Master stage. For such case, the invention discloses the possibility of iterative inference of the system performance, described by G and H. A model object is used, that has several interfaces along the axial range targeted. For instance, for a system to operate up to 3-5 mm, the model object 13M' can be several microscope slides of any thickness, which exhibits several discontinuities along the axial range, that will determine peaks in the A-scan. The embodiment consists in a closed loop between an embodiment at the Preparation stage, as shown in FIG. 6, reduced to the Mask Generator, 6, and the Preparation Storage block, 6S, and the embodiment of FIG. 7 at the Slave stage where the object 13 is replaced by the model object 13M'. The input 602 is not used. A-scans are collected whose peaks and sharpness are used as optimising parameters. A Corrector, 92, applies an adaptive array G, 541, and an adaptive array H, 542, versus the depth q. The initial condition of G and H can be given by a mirror as the model object 13M or the first layer of a multilayer object 13M'. When the adaptive arrays G and H match the non-linearity of the decoder 10 and unbalanced dispersion of the interferometer 1, maximum A-scan peaks and minimum width of such peaks are achieved and the loop stops. The optimised G and H arrays so inferred are then used to generate the Synthesised Complex Masks 60(*q*).

Obviously, the model object 13M' with several interfaces can be the object itself at the Slave stage. In this case, with the object in place the procedure detailed above is applied at a preparative stage. After a first object from the category of objects (such as eye, skin, paintings) is used to optimise G and H, the complex masks obtained using the first object are employed for all subsequent objects from the same category (eye, skin, paintings).

For an apparatus that relies on the FT signal of the Slave Channelled Spectrum, the closed loop is between two embodiments similar to the diagram in FIG. 25: the embodiment in FIG. 20, at the Preparation stage, that is reduced to the Mask Generator, block 6', and the embodiment of FIG. 21 where the object 13 is replaced by the model object 13M'. The input 602 is not used, and the embodiment of FIG. 21 where the object 13 is replaced by the model object 13M'. Obviously, the model object 13M' with several interfaces can be the object itself at the Slave stage.

5.6. Practical Procedure for the Master Stage that Eliminates the Need for Absolute Measurements of OPD Values As explained above, at the Master stage, a number of P-master channelled spectra 30(*p*) are stored for P positions of the model object (mirror), 13M, which determine p axial OPD(p)=2z(p) values. The absolute axial position z (OPD) of the model object in respect to z=0 (OPD=0) does not need to be known because the absolute position in depth where signal 70 originates from, is not relevant for the quality of the image. Any error in measuring the OPD at the Master stage leads to a simple axial shift of the A-scan or of the B-scan OCT image.

At least P=2 Master Channelled Spectra need to be acquired, for two distinct OPD values. The separation δz of the two positions can be accurately measured by placing the model object 13M on a high resolution translation stage (μm) or having a reference mirror moved to different axial positions via a high resolution translation stage (μm). For best accuracy in terms of axial calibration, a micrometre translation stage is needed. In this case, the P OPD values can be any values, stepped at equal or non-equal intervals. However, because the inference of G and H is based on a fitting procedure, in block 53 or block 5b3, the method is highly tolerant to errors in the measurement of the OPD values for the P channelled spectra acquired at the Master stage. Utilisation of a less precise translation stage can be compensated by an increase in the number P of channelled spectra acquired at the Master stage. Due to this tolerance, what is needed is only means to measure differential change in the OPD from OPD(p) to OPD(p+1) and not the exact value of the first OPD value, OPD(1).

A practical example now used in the lab is that of a program written on a PC. For example, for P=4, the program is written to expect 6 channelled spectra. The first 4 collections are channelled spectra acquired by stepping the OPD in equal steps of 0.5 mm for instance, followed by two more spectra where either the object arm or the reference arm are blocked. The program needs as input the number of acquisitions, in this case 6, the OPD step, in this case 0.5 mm, and the number of complex masks, Q. Steps of 0.5 mm are measured with a simple manual translation stage with divisions at 10 μm.

5.7. Metrology Measurements

As explained above, for imaging, the absolute value of OPD(1), i.e. the OPD value of the first Master channelled spectrum at the Master stage, is not needed. However if the invention is to be used for metrology applications, where exact determination of distances and thicknesses are required, then the exact value of the first OPD value, OPD(1), has to be determined. If the invention is to be used for metrology applications, where exact determination of dispersion D is required, then absolute values for the array G are needed (H being a phase, it is not possible to determine its absolute value). The function D can be expressed like $D(v)=2\pi n(v)v/c$, where $n(v)$ is the refractive index versus the optical frequency $v$ and $c$ is the speed of light. As shown in the disclosure, the invention is able to measure the relative value for the two arrays G and H according to a chosen pixel $r_c$ in the spectral domain, i.e. $G(r)=G_A(r)-G_A(r_c)$ and $H(r)=H_A(r)-H_A(r_c)$ where $G_A$ and $H_A$ are the absolute arrays respectively to G and H. In order to obtain $G_A(r)$ that corresponds to optical frequency $v(r)$ versus pixels $r$, a wavelength calibration is needed for one of the pixels $r$ out of r=1, 2 . . . to R. Let us say that a monochromatic light source is used that determines the optical frequency of a calibration pixel $r_c$. So the value $G_A(r_c)$ is known and $G_A(r)=G(r)+G_A(r_c)=v(r)$ can be retrieved. Using $H(r)=D(G_A(r))-D(G_A(r_c))$ and knowing $G_A(r)$, it is possible to obtain $D(v(r))-D(v(r_c))$ and measure the variation of D versus optical frequency.

6. EXPERIMENTS

Resolution and Drop-Off

The operation of the CMS principle is experimentally demonstrated, when using a Gaussian spectrum from a Super Luminescent Diode (SLD) centred at 1306±2 nm with a bandwidth of 28±1 nm. The detector is a spectrometer using an InGaAs linear camera SU-LDH (Goodrich SUI, Princeton, N.J.) with 1024 pixel.

The complex reflectivity 70 is calculated with the Reflectivity Calculator, 7, by applying a Discrete Integral Transform to the Slave Signal, 100, with the Kernel Function equal to the Synthesised Complex Masks. Inputs 602 and 603 have not been used in the Mask Generator, block 6. From the Master stage, G and H are retrieved, as shown respectively in FIGS. 26 and 27.

The slave interferometer has been used to produce A-scans, 81, for 3 positions of the reference mirror (240 μm, 740 μm and 1340 μm measured from 0-OPD) according to a Fourier transform (FIG. 28, dashed line), MS interferometry with experimental masks (FIG. 128, dots) and CMS interferometry (FIG. 28, line). FIG. 28 shows differences in terms of axial resolution and peak amplitude amongst the three methods. The amplitude normalization has been done with respect to the first position.

Although FT peaks broaden with depth due to the dispersion induced by the interferometer and the non-linearity of spectral conversion (either due to the spectrometer or due to nonlinear tuning of the swept source), the peak width of the correlation based MS and CMS does not change with depth, which means that MS and CMS can be expressed as a convolution operator between the reflectance profile and an axial PSF. Nevertheless, the peak amplitude decreases according to the OPD (position L) due to the roll-off characteristic to spectral domain methods (due to the coherence lengths of the interfering waves, either determined by the spectrometer resolution or by the linewidth of the tuning source).

The comparison between the A-scan obtained peaks using either MS or CMS shows that the peak sampling for MS is limited to the P number of Master Channeled Spectra measured at the Master stage, with a sampling interval of 20 μm in this study. MS A-scan peaks exhibit an under sampling effect. To address this problem, a larger number of experimental masks would be needed to sample the peaks within the A-scan. On the other hand, in CMS, this problem is elegantly addressed by setting the sampling as often as required. This is achieved via the variable l, applied to the Mask Generator. For instance, in FIG. 15, the sampling of CMS is equal to 2 μm, although the step between each experimental mask was equal to 20 μm.

Moreover, the axial resolution is better for CMS than for MS with non flattened spectrum or FT method. Indeed, the PSF obtained by CMS is related to only one experimental channeled spectrum $I_{u,v}$ profile. On the other hand, the PSF obtained by MS with spectrum not flattened is broader. This is because, this is related (by a Fourier transform) to the product of two experimental channeled spectra, $I_{u,v}$ and the Master Channeled Spectra. The product of two Gaussian shapes is narrower that each Gaussian profiles and this means less bandwidth and so less resolution (considering as an example that the source spectrum is Gaussian).

Data in Table 1 give the resolution of each peak according to the method used. The width of A-scan peaks in the MS and in the CMS is constant irrespective of the position L.

As expected, in case the correlation based MS employs the two channeled spectra as measured (i.e. no correction for the spectrum envelope), then the axial resolution is worse by a factor of 1.41 than the theoretically achievable limit. For MS with non flattened spectrum, the resolution is related to $FT^{-1}[A^2]$ while the resolution for CMS is related to $FT^{-1}[A]$. In the case where A exhibits a Gaussian shape, the width ratio of $FT^{-1}[A^2]$ and $FT^{-1}[A]$ is equal to $1/\sqrt{2} \approx 0.707$. It is important to distinguish two resolutions: 1) $\Delta L_{DC}$ equal to the FWHM of the peak $FT^{-1}[I_{DC}(G)(\tilde{v})]$. This resolution corresponds to the source spectrum only and determines the absolute ideal limit. Another way to calculate $\Delta L_{DC}$ is to use the standard equation $\Delta L_{DC}=(2Ln2)/\pi \times \lambda c^2/\Delta\lambda = 27\pm 1$ μm that gives the resolution according to the spectral width for a Gaussian shape spectrum of the broadband optical source 111 or tuning bandwidth of the swept source 112. 2) $\Delta L_{interf}$ equal to the FWHM of the peak $FT^{-1}[|L_{u,v}(\tilde{v})|]=FT^{-1}[\underline{A}(G(\tilde{v}))]$. This resolution depends on a combination of factors including the spectrum of the source, polarization effects and injection coupling in fibers that exhibits spectral behavior due to chromatic aberrations. $\Delta L_{interf}$ is defined as the achievable experimental resolution of the interferometer.

As it is shown in Table 1, the resolution of CMS is equal to the achievable experimental resolution of the interferometer for the three peaks, which confirms our theoretical approach.

TABLE 1

Axial resolution for three positions of the reference mirror (determining the different optical path difference values) and the method used.

| | $\Delta L_{DC}$ (μm) | $\Delta L_{interf}$ (μm) | FT (μm) | CMS (μm) | MS (μm) |
|---|---|---|---|---|---|
| Position 1 240 μm | 26 ± 1 | 27.0 ± 0.7 | 28.0 ± 0.3 | 27.0 ± 0.2 | 38.9 ± 0.5 |
| Position 2 740 μm | 26 ± 1 | 27.0 ± 0.7 | 56.0 ± 0.4 | 27.0 ± 0.2 | 37.4 ± 0.7 |
| Position 3 1340 μm | 26 ± 1 | 26.1 ± 0.7 | 104.5 ± 0.9 | 26.2 ± 0.2 | 37.8 ± 0.5 |

Stability of CMS

In order to compare the stability of MS interferometry and CMS interferometry, a succession of A-scans are measured for the same transversal point $(u_0,v_0)$ separated by a time interval of 2 seconds. with the Reflectivity Calculator, block 7, by applying the Discrete Integral Transform on the Slave Signal, 100, with the Kernel Function equal to the Synthesised Complex Masks. Inputs 602 and 603 have not been used in the Mask Generator, block 6. The Master Channelled Spectra have been recorded with an OPD step equal to 0.4 μm. The object is a static mirror.

FIG. 29 shows a sequence of A-scans, 81, versus time for the MS method using experimental channelled spectra as masks. The A-scans display a speckle pattern and instabilities of the phase (random phase).

FIG. 30 corresponds to the evolution of the A-scan, 81, versus time for CMS. By removing the random phase in the Phase Recovery Calculator, block 4, the A-scans are more stable and a clear stripe is visible This clearly shows the advantage of the CMS in terms of removing the effects of the random phase, or equivalently, producing the envelope of fringe patterns, unaffected by speckle.

Example of B-Scan Image with CMS

The complex reflectivity 70 is calculated with the Reflectivity Calculator, block 7, by applying the Discrete Integral Transform on the Slave Signal, 100, with the Kernel Function equal to the Synthesised Complex Masks 60. FIG. 17 shows the B-scan image, 81, of a human thumb obtained with CMS. No Dispersion Function, control input 602, to the Mask Generator 6 has been applied.

FIG. 31 shows a B-scan image, without Window W (input 603 to the Mask Generator 6) applied. The image of the surface (bottom) is disturbed by the high frequency components induced by the calculation of the Discrete Integral Transform.

FIG. 32 shows a B-scan with a Hamming Window applied. The edge of the surface is better defined to the slight detriment of the axial resolution.

Effect of the Number of Master Channelled Spectra on CMS B-Scan Images

The complex reflectivity 70 is calculated with the Reflectivity Calculator, block 7, by applying a Discrete Integral Transform on the Slave Signal, 100, with a Kernel Function equal to a Synthesised Complex Mask for each OPD (depth). Raw data, i.e. Master Channelled Spectra and Slave Signal, are identical to the previous section (example of B-Scan image with CMS). Inputs 602 and 603 have not been used in the Mask Generator, block 6. In FIGS. 33, 34, 35, all B-Scans, 81, have Q=390 points in depth.

FIG. 33 shows the B-scan image of a thumb produced by using P=2 Master Channelled Spectra 30 collected at $z_1$=0.07 mm and $z_2$=2.8 mm measured from the 0-optical path difference.

FIG. 34 shows the B-scan image of a thumb by using P=20 Master Channelled Spectra 30 regularly distributed within the depth interval $z_1$=0.07 mm to $z_{20}$=2.8 mm FIG. 35 shows the B-scan image of a thumb by using Q=P, i.e. 390 Master Channelled Spectra 30 from $z_1$=0.07 mm to $z_{390}$=2.8 mm. This experiment proves that the CMS method can be implemented using a very reduced number of masks, P.

The foregoing disclosure has been presented for the sake of illustration and description only. As such, it is not intended to be exhaustive or to limit the invention to the precise form disclosed. Other variations are possible in light of the above teaching which are considered to be within the scope of the present invention. Thus, it is to be understood that the claims appended hereto are intended to cover such modifications and variations, which fall within the true scope of the invention.

Other modifications and alterations may be used in the design and manufacture of the apparatus of the present invention and in the application of the methods disclosed without departing from the spirit and scope of the accompanying claims.

For instance, reference was made to Michelson interferometers, however any other interferometers in the practice of spectral domain interferometry and spectral domain OCT can be used, such as Mach Zehnder, Sagnac, or any others.

The optical source can be pulsed. The optical source may also be continuous (CW).

Variations may also include the operation of the invention in diverse areas of sensing and of OCT imaging, especially where there is a need for en-face display, such as in adaptive optics, confocal microscopy and optophysiology.

The final operation was often described as a discrete integral transform, however for the person skilled in the art it should be obvious that this can also be done via a dot product of signal when using 1D arrays. However, this should not be interpreted as restricting the generality of the operation, that means an integral over a product of two signals. Similar procedures to the discrete numerical calculations can be implemented by integrating continuous signals.

Reference was primarily made to electrical signals. Equally, it should be obvious for those skilled in the art, that these electrical signals, can be converted into any form of optical or sound signal, to be subject to similar processing operation.

Reference was primarily made to measurements and imaging in reflection, however measurements and imaging in transmission could equally be performed. The embodiments presented are not exhaustive, have been presented as a matter of example and modifications.

There are configurations where experimental channelled spectra are difficult to be acquired. For instance, in some configurations, the reference path is entirely in fibre, not allowing step adjustment of OPD in order to acquire channelled spectra. In these cases, the whole model object 13M is moved axially instead of adjusting the reference path length.

Graphics cards and field programmable gate arrays (FPGAs) can be used to perform the discrete integral transform and dot product operations in parallel at all depths (OPDs), process and display the data in parallel in combination with central processing units to speed up the investigation, according to progress in programming and development of signal processing interfaces and procedures.

Similar to the flying spot case, via scanners 151 and 152, equally full field embodiments are feasible, using 1D or 2D cameras to collect light from pixels in transversal section illuminated at once by the optical source.

The invention claimed is:

1. An apparatus for master slave interferometry of an object, the apparatus comprising:
    an interferometer having a pair of interferometer arms, wherein one of the interferometer arms is configured to hold the object, and wherein the interferometer is driven by an optical source and configured to irradiate the object and to output an output optical signal as a result;
    a photodetecting block configured to acquire the output optical signal at the interferometer output, and to output an electrical signal array {I(1), I(2), ... I(R)}, with a component I(r) for each resolvable spectral component in the source spectrum, wherein r=1, 2 ... R, wherein R is a positive integer larger or equal to 2;
    a Master Storage Block configured to store P master signals, wherein the master signals are electrical signal arrays {I(1), I(2), ... I(R)} output by the photodetecting block and P is a positive integer larger or equal to 2 and wherein at least two master signals for respective optical path differences in the interferometer are acquired using the photodetecting block, and wherein the master signals are obtained with a model object in one of the arms of the interferometer and from irradiating the model object using the interferometer;
    a Phase Recovery Calculator configured to receive the master signals from the Master Storage Block and to calculate the phases of the master signals by calculating the argument of the complex form of the master signals;
    a Synthesiser, configured to receive the phases of the master signals from the Phase Recovery Calculator and to generate two Synthesised Arrays, G={G(1), ..., G(r), ..., G(R)} and H={H(1), ..., H(r), ..., H(R)} based on the phases of the master signals;
    a Mask Generator having inputs for receiving the synthesised arrays and a plurality of control inputs, wherein the Mask Generator is configured to output an integer number, Q, of synthesized complex masks, each synthesized complex mask being a complex reference signal array, SM(q)={SM(q,1), SM(q,2), ... SM(q,R)}, q=1, 2 ... Q, for Q optical path differences in the interferometer, with a component SM(q,r) for each resolvable spectral component within the source spectrum, wherein the synthesised complex masks are calculated based on the two synthesised arrays;
    a Preparation Storage configured to receive and store the synthesised complex masks from the Mask Generator; and
    a plurality of Q Reflectivity Calculators, each with two inputs, wherein each Reflectivity Calculator processes two arrays, the complex mask SM(q) and F[I], where F[I] is a function of the electric signal array I and either F[I]=I or F[I] is the Fourier Transform of the electrical signal array I, wherein each Reflectivity Calculator outputs a complex reflectivity value C(q), from a depth in the object as determined by the optical path difference of the complex reference signal arrays, SM(q).

2. An apparatus according to claim 1, the Phase Recovery Calculator block provides at its output the modulation of the P master signals only, all P output signals having equal amplitude.

3. An apparatus according to claim 1, where the two synthesized arrays G={G(1), ..., G(r), ..., G(R)} and H={H(1), ..., H(r), ..., H(R)} are based on data modelling the instantaneous phase of the signal I of the interferometer when a model object replaces the object,
    where G is the variation of the instantaneous phase according to the spectral component r and H is the offset of the instantaneous phase according to the spectral component r.

4. An apparatus according to claim 1, where P and Q are positive integer numbers, where P is between 2 and 20 and Q is at least 100.

5. An apparatus according to claim 1, where the P Master signals stored in the Master Storage Block are electrical signals delivered by the photodetecting block and represent signals acquired by the photodetecting block at the output of the interferometer when a model object in different versions is inserted into one of the interferometer's arms, for different values of one of the parameters of the model object.

6. An apparatus according to claim 5, where the model object comprises a mirror and the variable parameter is the optical path difference in the interferometer.

7. An apparatus according to claim 1, wherein a dispersion function, D, is applied to one of the control inputs of the Mask Generator to compensate for dispersion due to the object.

8. An apparatus according to claim 1 comprising a closed loop feedback that depending on the value of C(q), determines a control signal applied to one of the control inputs of the Mask Generator in order to compensate for the dispersion due to the object at a depth defined by the user.

9. An apparatus according to claim 3, further comprising a closed loop feedback that iteratively presents C(q) to an input of the Synthesiser in order to determine the arrays G and H so adapted to the object investigated, that the C(q) strengths are maximised.

10. An apparatus for spectral interferometry according to claims 1 further comprising a scanning device and an interface optics to scan an optical output beam across the object in order to generate Q en-face OCT images from Q depths in the object as determined by the user, where the Q depths are not restricted to the depths of the master signals.

11. An apparatus according to claim 1, where the Reflectivity Calculators operate Discrete Integral Transforms of the signal F[I] with Q Kernels equal to the elements SM(q,r) for q=1, 2 ... Q and r=1, 2 ... R, wherein F[I]=I and Q Kernels equal to the elements Fourier Transform of SM(q) when F[I] is the Fourier Transform of the electric signal array I for q=1, 2 . . . Q and r=1, 2 . . . R.

12. A method for Master Slave interferometry of an object using an interferometer having a pair of interferometer arms with an object placed in one of the interferometer arms and configured to irradiate the object and output an optical signal, and a photodetecting block for receiving the optical signal output by the interferometer, the method comprising:

at a Master step, acquiring, using the photodetecting block, at least two master signal array measurements for respective optical path differences in the interferometer, wherein the master signal array measurements are obtained with a model object in one of the arms of the interferometer and from irradiating the model object using the interferometer;

storing the acquired master signals in a Master Storage Block;

calculating, by a Phase Recovery Calculator, a phase associated with each of the master signals;

generating, by a Synthesiser, two arrays G={G(1), . . . ,G(r), . . . ,G(R)} and H={H(1), . . . , H(r), . . . , H(R)}, based on the phases calculated by the Phase Recovery Calculator, wherein R is any number and r=1, 2, . . . R;

in a Preparation step generating, by a Mask Generator, Q synthesized complex masks SM(q) for Q values of optical path difference (OPD) in an interferometer, where each synthesized complex mask SM(q) is a complex reference signal obtained from the master signal array measurements, and Q is any number and q=1, 2, . . . Q;

in a slave step, acquiring, using the photodetecting block, a slave signal proportional to an optical measuring spectrum at the output of the interferometer, wherein the slave signal is acquired with the object in one of the interferometer arms and upon irradiating the object with the interfereometer; and where by processing the Q complex reference signals and the slave signal, Q amplitudes A(q) and Q phases $\Phi$(q) are obtained for the q part of the slave signal obtained in the slave step that originates from the same optical path difference as that of the reference signal measured.

13. A method for master slave interferometry according to claim 12 where each master signal array stores a signal proportional to the spectrum obtained at the output of the interferometer, when the object is replaced by a model object, for different values of one of the parameters of the model object.

14. A method for Master Slave interferometry according to claim 12, where the Q complex reference signals are built based on the dispersion function given by the user in order to compensate the dispersion of the object at a specific depth, and the measurement of the instantaneous phase of Master signals, where a Master signal is a signal from the photodetecting block and is proportional to the spectrum obtained at the output of the interferometer, when the object is replaced by a model object, for P different values of one of the parameters of the model object.

15. A method for Master Slave interferometry according to claim 12, where depth dependent dispersion introduced by the object is iteratively corrected in closed loop by modifying the Q complex q-reference signals.

16. A method for Master Slave interferometry according to claim 12, where the Q complex reference signals are built by feedback from Q amplitudes A(q) and Q phases $\Phi$(q) to maximise all A(q) values, from the object.

17. A method for master slave interferometry according to claim 12, where the operation of processing the Q complex reference signals and the output signal is based on Discrete Integral Transform of the two signals.

18. A method for master slave interferometry according claim 12, wherein the acquisition of spectrum at the output of an interferometer comprises providing a broadband source driving the interferometer and wherein the photodetecting block comprises a spectrometer.

19. A method for master slave interferometry according to claim 12, wherein the acquisition of spectrum at the output of an interferometer comprises providing a narrow band tunable source driving the interferometer and the photodetecting block comprises a photo-detector.

20. A method for Master Slave optical interferometry according to claim 12 wherein the method is used to carry out optical coherence tomography (OCT) to produce en-face OCT images, wherein:

in a preliminary step, Q complex reference signals, SM(q), are prepared, corresponding to Q depths in the object, in a second step acquiring a volume of measuring spectra, $I_{(u,v)}$ at the output of the photodetecting block, for each pixel (u,v) in the two lateral directions across the object with the third coordinate depending on the optical frequency, and where a discrete transform integral is performed for the signal $I_{(u,v)}$ with the kernel equal to the reference signal SM(q), to obtain a complex result, $C_{u,v}(q)$ followed by creation of Q en-face brightness OCT images, with brightness determined by the absolute value of $C_{u,v}(q)$ versus (u,v) and of en-face phase OCT images, with phase determined by the argument of $C_{u,v}(q)$, for each q=1, . . . Q.

* * * * *